(12) United States Patent
Moriyama et al.

(10) Patent No.: US 7,440,706 B2
(45) Date of Patent: Oct. 21, 2008

(54) IMAGE FORMATION APPARATUS

(75) Inventors: Tsuyoshi Moriyama, Ibaragi (JP); Kenji Fukushi, Ibaragi (JP); Yoshio Mizuno, Chiba (JP); Tatsuaki Hashimoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/941,623

(22) Filed: Nov. 16, 2007

(65) Prior Publication Data

US 2008/0075488 A1    Mar. 27, 2008

Related U.S. Application Data

(62) Division of application No. 10/691,516, filed on Oct. 24, 2003.

(30) Foreign Application Priority Data

Oct. 24, 2002  (JP)  ............................. 2002-309718
Oct. 24, 2002  (JP)  ............................. 2002-309719

(51) Int. Cl.
*G03G 15/00* (2006.01)
*H04N 1/00* (2006.01)
(52) U.S. Cl. .............................. 399/43; 399/9; 358/406
(58) Field of Classification Search .................. 399/43, 399/49, 50, 51, 53, 66, 301; 358/406
See application file for complete search history.

(56) References Cited

U.S. PATENT DOCUMENTS 5,546,161 A    8/1996  Sakai et al. ................. 355/200
5,905,581 A    5/1999  Suzuki et al. ............... 358/468
5,950,036 A *  9/1999  Konishi ......................... 399/8
6,122,461 A    9/2000  Shinohara ..................... 399/43

FOREIGN PATENT DOCUMENTS

| JP | 63-43169   | 2/1988  |
| JP | 63-147177  | 6/1988  |
| JP | 63-280275  | 11/1988 |
| JP | 1-261668   | 10/1989 |

* cited by examiner

*Primary Examiner*—David M Gray
*Assistant Examiner*—Joseph S. Wong
(74) *Attorney, Agent, or Firm*—Fitzpatrick, Cella, Harper & Scinto

(57) ABSTRACT

An image formation apparatus comprises: an automatic adjustment unit for automatic adjustment of the apparatus; a job queuing unit for queuing image formation jobs; a counting unit for counting the number of pages from the previous automatic adjustment, for each automatic adjustment item; a determining unit for determining whether the number of image formation pages for automatic adjustment will be reached during execution of the image formation queued job; and a control unit wherein, in the event that the determining unit determines that the number of image formation pages for automatic adjustment will be reached during execution of the image formation job queued by the job queuing unit, automatic adjustment is performed before starting executing of the image formation queued job even though the number of image formation pages counted by the counting unit has not reached the number for the automatic adjustment is to be performed.

3 Claims, 32 Drawing Sheets

FIG. 11

JOBS WAITING

| JOB 1 | EXECUTING |
| JOB 2 | 100 PAGES × 2 COPIES |
| JOB 3 | 10 PAGES × 50 COPIES |

FIG. 12

| ADJUSTMENT ITEM | THRESHOLD VALUE (X) | PRESENT COUNT (Y) | REMAINING NUMBER OF PAGES TO ADJUSTMENT (X−Y) | NUMBER OF PAGES OF NEXT JOB (Z) |
|---|---|---|---|---|
| DENSITY ADJUSTMENT | 500 | 450 | 50 | 200 |
| RESIST ADJUSTMENT | 500 | 200 | 300 | 200 |

| ADJUSTMENT ITEM | THRESHOLD VALUE (X) | SECOND THRESHOLD VALUE (X2) | PRESENT COUNT VALUE (Y) |
|---|---|---|---|
| DENSITY ADJUSTMENT | 500 | 450 | 460 |
| REGISTRATION ADJUSTMENT | 500 | 450 | 200 |

FIG. 18

| | THRESHOLD VALUE (X) | SECOND THRESHOLD VALUE (X2) | |
|---|---|---|---|
| | | AVsum≧(1/2)Vmax | AVsum<(1/2)Vmax |
| DENSITY ADJUSTMENT | 500 | 300 | 450 |
| RESIST ADJUSTMENT | 500 | 300 | 450 |

FIG. 31

| | Job Name | Printer | Status | Priority | Job ID | Pages | Copies | Paper Size | Comment |
|---|---|---|---|---|---|---|---|---|---|
| 1 | File-6 | MFP1204 | Spooling | High | #00122 | 200 | 20 | Letter | |
| 2 | File-7 | Cluster-1 | Hold | Low | #00121 | 120 | 30 | 11x17 | |
| 3 | File-8 | MFP1205a | Ripping | Medium | #00120 | 300 | 15 | Letter | |
| 4 | File-9 | MFP1204 | Wait to Print | Medium | #00119 | 20 | 350 | Letter | |
| 5 | File-10 | MFP1205c | Printing | Medium | #00118 | 155 | 10 | 11x17 | |

| | Job Name | Printer | Status | | | Pages | Copies | Paper Size | Comment |
|---|---|---|---|---|---|---|---|---|---|
| 1 | File-E | MFP1204 | Printed | | | 110 | 30 | Letter | |
| 2 | File-D | MFP1205b | Canceled | | | 25 | 20 | 11x17 | |
| 3 | File-C | Cluster-1 | Printed | | | 35 | 150 | Letter | |
| 4 | File-B | Cluster-2 | Printed | | | 110 | 40 | Letter | |
| 5 | File-A | MFP1205c | Canceled | | | 240 | 35 | 11x17 | |

FIG. 33

Job Status (1709)

| | Job Name | Printer | Status | Priority | Pages | Copies | Paper Size | Comment |
|---|---|---|---|---|---|---|---|---|
| 1 | File-6 | MFP1204 | Spooling | High | 200 | 20 | Letter | |
| 2 | File-7 | Cluster-1 | Hold | Low | 120 | 30 | 11x17 | |
| 3 | File-8 | MFP1205a | Ripping | Medium | 300 | 15 | Letter | |
| 4 | File-9 | MFP1204 | Wait to Print | Medium | 20 | 350 | Letter | |
| 5 | File-10 | MFP1205c | Printing | Medium | 155 | 10 | 11x17 | |

Finished Job (1711)

| | Job Name | Printer | Status | Job ID | Pages | Copies | Paper Size | Comment |
|---|---|---|---|---|---|---|---|---|
| 1 | File-E | MFP1204 | Printed | #00122 | 110 | 30 | Letter | |
| 2 | File-D | MFP1205b | Canceled | #00121 | 25 | 20 | 11x17 | |
| 3 | File-C | Cluster-1 | Printed | #00120 | 35 | 150 | Letter | |
| 4 | File-B | Cluster-2 | Printed | #00119 | 110 | 40 | Letter | |
| 5 | File-A | MFP1205c | Canceled | #00118 | 240 | 35 | 11x17 | |

MAINTENANCE LIST

| ITEM | TYPE | REFERENCE | ESTIMATED TIME PERIOD |
|---|---|---|---|
| SUPPLY TONER | SUPPLY | SENSOR | 1 |
| SUPPLY SHEETS | SUPPLY | SENSOR | 1 |
| DOCUMENT ILLUMINATION LAMP | REPLACEMENT OF EXPENDABLES | COUNTER (TIME) | 9 |
| DOCUMENT CYLINDER | REPLACEMENT OF EXPENDABLES | COUNTER (COPIES) | 21 |
| DEVELOPING ROLLER | REPLACEMENT OF EXPENDABLES | COUNTER (COPIES) | 21 |
| CLEANER SEPARATION CLAW | REPLACEMENT OF EXPENDABLES | COUNTER (COPIES) | 15 |
| CLEANING BLADE | REPLACEMENT OF EXPENDABLES | COUNTER (COPIES) | 15 |
| PRIMARY CHARGER | REPLACEMENT OF EXPENDABLES | COUNTER (COPIES) | 0.8 |
| TRANSFER/SEPARATION CHARGER | REPLACEMENT OF EXPENDABLES | COUNTER (COPIES) | 3.5 |
| PRE-TRANSFER CHARGER | REPLACEMENT OF EXPENDABLES | COUNTER (COPIES) | 1.5 |
| OZONE FILTER | REPLACEMENT OF EXPENDABLES | COUNTER (COPIES) | 1 |
| PRIMARY CHARGING LINE CLEANER | REPLACEMENT OF EXPENDABLES | COUNTER (COPIES) | 4 |
| TRANSFER CHARGING LINE CLEANER | REPLACEMENT OF EXPENDABLES | COUNTER (COPIES) | 4 |
| SEPARATION CHARGING LINE CLEANER | REPLACEMENT OF EXPENDABLES | COUNTER (COPIES) | 6 |
| PRE-TRANSFER CHARGING LINE CLEANER | REPLACEMENT OF EXPENDABLES | COUNTER (COPIES) | 3.5 |
| PRE-TRANSFER CHARGER SCRAPER | REPLACEMENT OF EXPENDABLES | COUNTER (COPIES) | 5.5 |
| FIXING UPPER ROLLER | REPLACEMENT OF EXPENDABLES | COUNTER (COPIES) | 10 |
| FIXING LOWER ROLLER | REPLACEMENT OF EXPENDABLES | COUNTER (COPIES) | 3 |
| FIXING WEB | REPLACEMENT OF EXPENDABLES | COUNTER (COPIES) | 1 |
| INSULATING BUSH | REPLACEMENT OF EXPENDABLES | COUNTER (COPIES) | 10 |
| DISCHARGE UPPER SEPARATION CLAW | REPLACEMENT OF EXPENDABLES | COUNTER (COPIES) | 1 |
| DISCHARGE LOWER SEPARATION CLAW | REPLACEMENT OF EXPENDABLES | COUNTER (COPIES) | 5 |

FIG. 38

| | | | |
|---|---|---|---|
| FEEDING ROLLER (DECK, CASSETTE) | REPLACEMENT OF EXPENDABLES | COUNTER (COPIES) | 4 |
| TRANSPORTING ROLLER (DECK, CASSETTE) | REPLACEMENT OF EXPENDABLES | COUNTER (COPIES) | 4 |
| SEPARATION ROLLER (DECK, CASSETTE) | REPLACEMENT OF EXPENDABLES | COUNTER (COPIES) | 4 |
| MULTI-FEEDING ROLLER | REPLACEMENT OF EXPENDABLES | COUNTER (COPIES) | 4 |
| MULTI-TRANSPORTING ROLLER | REPLACEMENT OF EXPENDABLES | COUNTER (COPIES) | 4 |
| MULTI-SEPARATION ROLLER | REPLACEMENT OF EXPENDABLES | COUNTER (COPIES) | 4 |
| DOCUMENT TABLE GLASS CLEANING | REGULAR CLEANING | COUNTER (COPIES) | 1 |
| MIRROR CLEANING | REGULAR CLEANING | COUNTER (COPIES) | 2 |
| DOCUMENT-ILLUMINATION REFLECTING PLATE CLEANING | REGULAR CLEANING | COUNTER (COPIES) | 2 |
| OPTICAL RAIL CLEANING & OILING | REGULAR CLEANING | COUNTER (COPIES) | |
| DUST-PROOF FILTER CLEANING | REGULAR CLEANING | COUNTER (COPIES) | 5 |
| OPTICAL WIRE CHECK & ADJUSTMENT | REGULAR CLEANING | COUNTER (COPIES) | 7 |
| DRUM HEATER SLIDER CLEANING & OILING | REGULAR CLEANING | COUNTER (COPIES) | |
| TRANSFER BELT CLEANING | REGULAR CLEANING | COUNTER (COPIES) | 1 |
| DUST-PROOF GLASS CLEANING | REGULAR CLEANING | COUNTER (COPIES) | 1 |
| DEVELOPING ROLLER CLEANING | REGULAR CLEANING | COUNTER (COPIES) | 4.5 |
| FIXING DEVICE ENTRANCE GUIDE CLEANING | REGULAR CLEANING | COUNTER (COPIES) | 1 |
| PHOTOSENSITIVE DRUM CLEANING | REGULAR CLEANING | COUNTER (COPIES) | |
| OZONE FILTER CLEANING | REGULAR CLEANING | COUNTER (COPIES) | 4 |
| CHARGED LINE CLEANING | REGULAR CLEANING | COUNTER (COPIES) | 12 |
| GRID LINE CLEANING | REGULAR CLEANING | COUNTER (COPIES) | 3 |
| CHARGING LINE CLEANING | REGULAR CLEANING | COUNTER (COPIES) | 20 |
| STANDARD WHITE PLATE CLEANING | REGULAR CLEANING | COUNTER (COPIES) | 2 |

FIG. 39

| | | | |
|---|---|---|---|
| RESIST ROLLER (UPPER/LOWER) CLEANING | REGULAR CLEANING | COUNTER (COPIES) | 0.5 |
| TRANSFER GUIDE/ ROLLER CLEANING | REGULAR CLEANING | COUNTER (COPIES) | 1 |
| TRANSPORTING ROLLERS CLEANING | REGULAR CLEANING | COUNTER (COPIES) | 0.5 |
| ROLLER ELECTRODE CLEANING | REGULAR CLEANING | COUNTER (COPIES) | 0.5 |
| PRE-TRANSFER CHARGER LED | REGULAR CLEANING | COUNTER (COPIES) | 2 |
| FIXING WEB CHECK | REGULAR CLEANING | COUNTER (COPIES) | 1 |
| FIXING OIL PAN CLEANING | REGULAR CLEANING | COUNTER (COPIES) | 3 |
| FIXING THERMISTOR CLEANING | REGULAR CLEANING | COUNTER (COPIES) | 13.5 |
| DISCHARGE SEPARATION CLAW (UPPER/LOWER) CLEANING | REGULAR CLEANING | COUNTER (COPIES) | 6 |
| WASTE TONER COLLECTION UNIT CHECK | REGULAR CLEANING | COUNTER (COPIES) | 3 |
| TONER SUPPLY OPENING CLEANING | REGULAR CLEANING | COUNTER (COPIES) | 1 |
| DEVELOPING CYLINDER CHECK | REGULAR CLEANING | COUNTER (COPIES) | 4.5 |
| CLEANER MAGNETIC ROLLER BEARING CLEANING | REGULAR CLEANING | COUNTER (COPIES) | 8 |
| CLEANER TONER PAN CLEANENG | REGULAR CLEANING | COUNTER (COPIES) | 8 |
| BOTH-SIDE SIDE REGISTRATION SENSOR CHECK | REGULAR CLEANING | COUNTER (COPIES) | 0.5 |

IMAGE FORMATION APPARATUS

This is a divisional of U.S. patent application Ser. No. 10/691,516, filed Oct. 24, 2003, now pending.

BACKGROUND OF THE INVENTION

1. Field of the Invention

The present invention relates to an image formation apparatus having functions for automatic adjustment or maintenance.

2. Description of the Related Art

In some cases, these types of conventional image formation apparatuses have a problem in that image density changes due to the change in a photosensitive member and a developing device over time, or due to the change in the temperature or humidity in the environment where the apparatus has been situated. As a countermeasure for the above-described problem, various proposals have been made with regard to a technique wherein parameters having an influence upon the image density of a toner image, e.g., a charging bias, a developing bias, and so forth, are adjusted at a suitable timing, thereby stabilizing the image density. For example, in a case of forming a color image using multiple image carrying members, a method of controlling toner density (Japanese Patent Laid-Open No. 63-147177), and a method of controlling an exposure amount (Japanese Patent Laid-Open No. 63-280275, are known wherein control is performed based upon detected information with regard to a predetermined pattern (test patch) transferred onto transfer means such as a common transfer belt or the like for transferring each visible image on the image carrying member onto a transfer member.

Furthermore, a method is known wherein the aforementioned test patch is transferred onto the transfer means, the density thereof is measured, and one of multiple process parameters relating to the image formation means is adjusted based thereupon (Japanese Patent Laid-Open No. 63-43169). Furthermore, a method is known wherein exposure is made with various exposure amount in the range corresponding to the change in the light-portion potential estimated from the change in the environment, and the light-portion potential, which is to be a standard maximal density, is estimated based upon the pattern formed of the portions of different light-portion potential transferred onto the transfer means (Japanese Patent Laid-Open No. 1-261668). Furthermore, in addition to the above-described, a method is known wherein the change in the size of one dot is measured from the positional deviation of the pattern on the transfer means, and the process parameters such as an exposure period, output, a developing bias, and the like, are adjusted based upon the measurement results so as to maintain the suitable size of one dot (Japanese Patent Laid-Open No. 63-280275).

However, the above-described conventional image formation apparatuses have a problem in that in the event that the total count reaches a predetermined threshold number during processing, even for a job having just a few copies, the image formation apparatus enters an adjustment mode such as a density adjustment mode, leading to a problem of increase of time for processing the jobs beyond the anticipation of the user. There has also been a problem in that in the event that the image formation apparatus enters an adjustment mode, the tone or the like of the image formed may not be the same before and after the adjustment.

SUMMARY OF THE INVENTION

It is an object of the present invention to provide an image formation apparatus to solve the above-described problems.

To this end, according to a first aspect of the present invention, an image formation apparatus for forming images based on input image data comprises: an automatic adjustment unit for performing automatic adjustment of the image formation apparatus; a job queuing unit for queuing image formation jobs; a counting unit for counting the number of image formation pages from the previous automatic adjustment, for each automatic adjustment item which the automatic adjustment unit performs; a determining unit for determining whether or not the number of image formation pages at which the automatic adjustment is to be performed by the automatic adjustment unit will be reached during execution of the image formation job queued by the job queuing unit, based on the number of image formation pages counted by the counting unit and the image formation job queued by the job queuing unit; and a control unit wherein, in the event that the determining unit determines that the number of image formation pages at which the automatic adjustment is to be performed by the automatic adjustment unit will be reached during execution of the image formation job queued by the job queuing unit, automatic adjustment is performed by the automatic adjustment unit before starting executing of the image formation job queued by the job queuing unit even though the number of image formation pages counted by the counting unit has not reached the number at which the automatic adjustment is to be performed by the automatic adjustment unit.

According to a second aspect of the present invention, an image formation apparatus for forming images based on input image data comprises: an automatic adjustment unit for performing automatic adjustment of the image formation apparatus; a counting unit for counting the number of image formation pages from the previous automatic adjustment, for each automatic adjustment item which the automatic adjustment unit performs; a control unit for effecting automatic adjustment by an automatic adjustment unit, in response to the number of image formation pages counted by the counting unit reaching a first threshold value; a setting unit for setting a second threshold value smaller than the first threshold value; and a determining unit for determining whether or not the number of image formation pages counted by the counting unit have reached the second threshold value set by the setting unit before starting execution of the next image formation job; wherein, in the event that the determining unit determines that the number of image formation pages counted by the counting unit have reached the second threshold value, the control unit effects automatic adjustment by the automatic adjustment unit before starting executing of the next image formation job even though the number of image formation pages counted by the counting unit has not reached the first threshold value.

According to a third aspect of the present invention, an image formation apparatus for forming images based on input image data comprises: an automatic adjustment unit for performing automatic adjustment of the image formation apparatus; a counting unit for counting the number of image formation pages from the previous automatic adjustment, for each automatic adjustment item which the automatic adjustment unit performs; a control unit for effecting automatic adjustment by an automatic adjustment unit, in response to the number of image formation pages counted by the counting unit reaching a first threshold value; a setting unit for setting a second threshold value smaller than the first threshold value; and a determining unit for determining, at the time of an interruption of an image formation job, whether or not the number of image formation pages counted by the counting unit have reached the second threshold value set by the setting unit; wherein, in the event that the determining unit determines that the number of image formation pages counted by the counting unit have reached the second threshold value, the control unit effects automatic adjustment by the automatic adjustment unit before resuming from the interruption of the image formation job even though the number of image formation pages counted by the counting unit has not reached the first threshold value.

According to a fourth aspect of the present invention, an image formation apparatus for forming images based on input image data comprises: an acquiring unit for acquiring indicators relating to the time for performing the next maintenance for predetermined maintenance items; and a display unit for displaying indicators acquired by the acquiring unit for each maintenance item, along with the amount of time required for the maintenance.

According to a fifth aspect of the present invention, an image formation apparatus for forming images based on input image data comprises: an acquiring unit for acquiring indicators relating to the time for performing the next maintenance for predetermined maintenance items; and a display unit for displaying indicators acquired by the acquiring unit for each maintenance item; wherein the acquiring unit comprises a counting unit for counting the number of image formation sheets from the point that the previous maintenance ended for each maintenance item, and a calculating unit for calculating the number of remaining image formation sheets to the next maintenance, based on the counted number of image formation sheets, whereby the calculated number of remaining image formation sheets is acquired as the indicator.

According to a sixth aspect of the present invention, an image formation apparatus for forming images based on input image data comprises: an acquiring unit for acquiring indicators relating to the time for performing the next maintenance for predetermined maintenance items; a display unit for displaying indicators acquired by the acquiring unit for each maintenance item; a selecting unit for selecting the maintenance items based on the indicators displayed for each of the maintenance items; and a control unit for controlling the start of maintenance corresponding to a selected maintenance item.

According to a seventh aspect of the present invention, an image formation apparatus for forming images based on input image data comprises: an acquiring unit for acquiring indicators relating to the time for performing the next maintenance for predetermined maintenance items; a display unit for displaying indicators acquired by the acquiring unit for each maintenance item; a transmission unit for transmitting indicators acquired for each of the maintenance items to other apparatuses; a reception unit for receiving maintenance items selected by the other apparatuses based on the transmitted indicators; and a control unit for controlling the start of maintenance corresponding to the received maintenance items.

Due to the above configurations, the downtime due to adjustment can be reduced at the time of performing jobs. That is to say, the user can easily confirm the adjustment item which could be performed during the next job, in idle time up to the next job, at the time of turning on the power supply, or the like. Also, in the event that there is time up to the next job, the user can perform adjustment beforehand. Further, the user can select multiple adjustment items, and accordingly, the selected multiple adjustment items can be performed at the same time, thereby markedly reducing the downtime due to adjustment during the job.

Furthermore, multiple image formation apparatuses are connected through a network, and accordingly, the user can easily confirm the adjustment item of any image formation apparatus, which could be performed during the next job, from another image formation apparatus, and moreover, the user can give adjustment instructions for the image formation apparatus from the another one. thus, the user can give adjustment instructions for any image formation apparatus connected to the network from another image formation apparatus, so even in the event that the image formation apparatuses are situated distant one from another, the user can perform adjustment without the user moving to the distant image formation apparatus.

Further objects, features and advantages of the present invention will become apparent from the following description of the preferred embodiments (with reference to the attached drawings).

BRIEF DESCRIPTION OF THE DRAWINGS

FIG. 11 shows a table which indicates queuing of jobs.

FIG. 12 shows a table which indicates a threshold value X, a present count Y, a remaining number of pages, and the like, for each adjustment item.

FIG. 18 shows a table which indicates the second threshold values.

FIG. 31 is a diagram which illustrates a main screen of a web service provided within a document server 1102.

FIG. 33 is a diagram which illustrates a job status display portion 1709.

FIG. 34 is a diagram which illustrates a job history display portion 1711.

FIG. 37 is a diagram which shows an item list for maintenance.

FIG. 38 is a diagram which shows an item list for maintenance.

FIG. 39 is a diagram which shows an item list for maintenance.

DESCRIPTION OF THE PREFERRED EMBODIMENTS

First Embodiment

Figure 1:
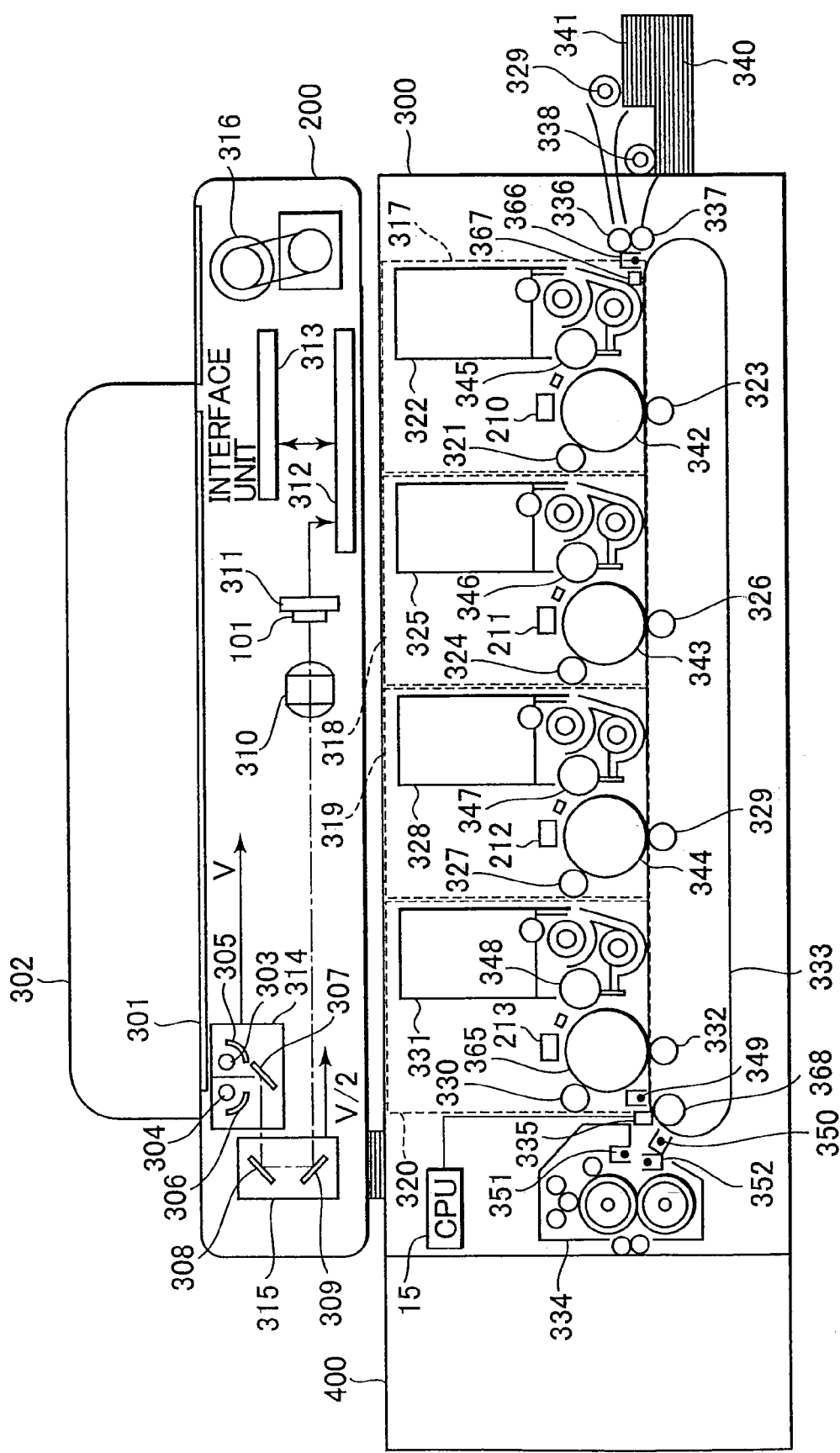
FIG. 1 is a diagram which illustrates a configuration of an image formation apparatus according to a first embodiment.

FIG. 1 is a diagram which illustrates a configuration of an image formation apparatus according to a first embodiment. The image formation apparatus principally comprises a color reader unit 200, a printer unit 300, and a finisher unit 400.

[Color Reader Unit]

First, description will be made regarding the configuration of the color reader unit 200. Reference numeral 101 denotes a CCD, 311 denotes a board where the CCD 101 has been mounted, and 312 denotes an image processing unit. The image processing unit includes a circuit (not including the CCD 101) shown in FIG. 2, a binary conversion unit 201 shown in FIG. 3, video signal count units 220 through 223, and delay units 202 through 205.

Reference numeral 301 denotes a document table glass (platen), and 302 denotes a document feeder (DF). Note that instead of employing the document feeder 302, the image formation apparatus may have a configuration including a flat pressing plate. Reference numerals 303 and 304 denote light sources (halogen lamp or fluorescent lamp) for illuminating a document sheet. Reference numerals 305 and 306 denote curved reflectors for collecting the light from the light sources 303 and 304 to the document.

Reference numerals 307 through 309 denote mirrors, and 310 denotes a lens for collecting the reflected light or projected light from the document sheet onto the CCD 101. Reference numeral 314 denotes a carriage for storing the halogen lamps 303 and 304, curved reflectors 305 and 306, and a mirror 307. Reference numeral 315 denotes a carriage for storing mirrors 308 and 309. Reference numeral 313 denotes an interface for communicating with other IPUs (image processing units) or the like.

Note that the carriage 314 is automatically moved with a speed V, and the carriage 315 is automatically moved with a speed V/2 in the direction orthogonal to the electrical scanning (main scanning) of the CCD 101, i.e., auxiliary scanning is performed, whereby the entire face of the document sheet is scanned.

[Image Processing Unit]

Figure 2:
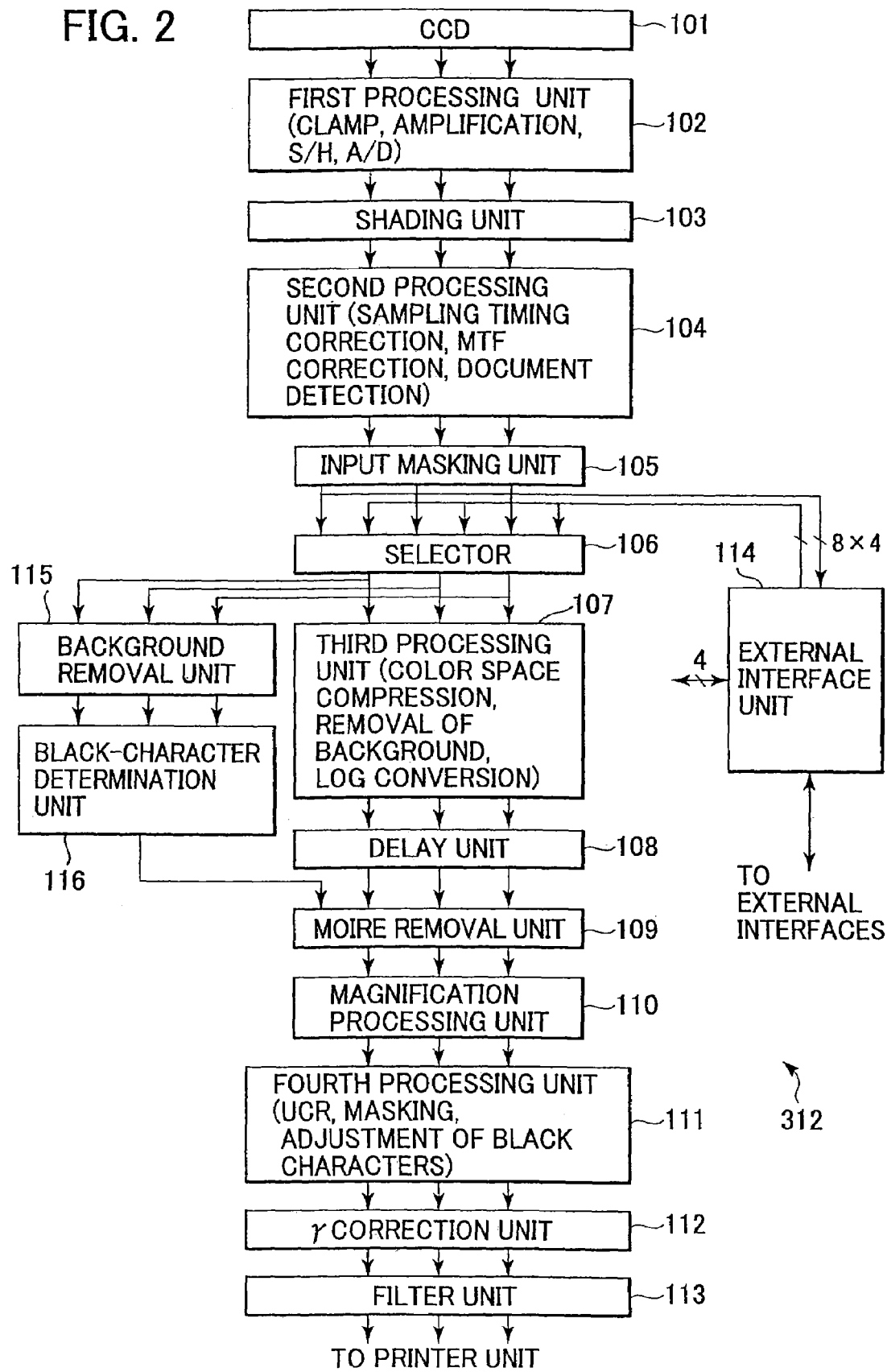
FIG. 2 is a block diagram which illustrates a configuration of an image processing unit 312.

FIG. 2 is a block diagram which illustrates a configuration of the image processing unit 312. The light from the light sources 303 and 304 is reflected by the document sheet on the document table glass 301, and the reflected light is introduced onto the CCD 101 so as to be converted to electric signals. With the CCD 101 comprising color sensors, an arrangement may be made wherein RGB color filters are disposed inline on a single-line CCD in the order of R, G, and B, an arrangement may be made wherein the CCD 101 comprises a three-line CCD with an R-filter, a G-filter, and a B-filter arrayed on each line of the CCD, an arrangement may be made wherein an on-chip filter is employed, or an arrangement may have a separate configuration for the filters and the CCD.

Upon electric signals (analog image signals) being input to the image processing unit 312 from the CCD 101, the electric signals are held as a sample by a first processing unit 102 (clamp, amplification, S/H, A/D), the dark level of the analog image signal is clamped to the standard potential, is amplified with a predetermined gain, and is subjected to A/D conversion. In A/D conversion, the analog signals are converted into 8-bit signals for each of R, G, and B.

A shading unit 103 performs shading correction and black correction for the RGB signals, following which the corrected signals are input to a second processing unit 104 (sampling time correction, MTF correction, document detection). First, description will be made regarding sampling-timing correction. In a case that the CCD 101 is a three-line CCD, the reading positions are different between the three CCD lines at the same sampling time, and accordingly, the delay time is calculated for each CCD line based upon reading speed, and sampling timing is corrected using the calculated delay time so that the reading positions of the three CCD lines become the same. With the MTF correction, the change in MTF due to the change in the reading speed or magnification is corrected. With the document detection, the size of the document sheet is detected by scanning the document sheet on the document table glass.

Upon the digital signals subjected to the above-described sampling-timing correction being input to an input masking unit 105, the input masking unit 105 performs correction with regard to the spectral sensitivity of the CCD 101, and the spectral properties of the light sources 303 and 304, and the curved reflectors 305 and 306. The input masking unit 105 outputs the corrected signals to a selector 106 for performing switching between the corrected signals and external signals through interfaces. The signals output from the selector 106 are input to a third processing unit 107 (color space compression, removal of background, log conversion) and a background removal unit 115.

The signals input to the background removal unit 115 are subjected to removal of the background, following which the signals are input to a black-character determination unit 116 for determining whether or not there are any black characters in the document, and the black-character determination unit 116 generates black-character signals from the document. As described above, the same output signals from the selector 106 are input to the third processing unit 107 for performing color-space compression. With the aforementioned color-space compression, first, determination is made whether or not the image signals read out are in the range which can be reproduced by the printer. Subsequently, in the event that the image signals are in the range, the image signals pass through this processing without change, otherwise, the image signals are corrected so that the image signals are in the range. Furthermore, the third processing unit 107 performs background removal processing, and logarithm conversion for converting the RGB signals into the CMY signals. The signals output from the third processing unit 107 is subjected to timing adjustment by the delay unit 108 so as to match the timing of the signals generated by the black-character determination unit 116.

The aforementioned two kinds of signals are subjected to removal of moiré by a moiré removal unit 109, and are subjected to magnification processing in the main-scanning direction by a magnification processing unit 110. Upon the signals subjected to the aforementioned processing by the magnification processing unit being input to a fourth processing unit 111 (UCR, masking, adjustment of black characters), the fourth processing unit 111 performs UCR processing wherein CMYK signals are generated from the CMY signals, performs masking processing wherein the generated CMYK signals are corrected into signals suitable for printout, and adjusts the CMYK signals based upon the determination signals generated by the black-character determination unit 116.

The signals subjected to the above-described processing by the fourth processing unit 111 are subjected to density adjustment by a γ correction unit 112, following which the signals are subjected to smoothing or edge processing by a filter unit 113. The signals subjected to such processing are converted from eight-bit signals of into one-bit signals by the binary conversion unit 201. Binary conversion may be made with any of the dithering-method, the error-diffusion method, the improved error-diffusion method, and the like.

[Printer Unit]

Next, description will be made regarding a configuration of the printer unit 300. In FIG. 1, reference numeral 317 denotes a yellow image formation unit, 318 denotes a magenta image formation unit, 319 denotes a cyan image formation unit, and 320 denotes a black image formation unit. These image formation units have the same configuration, so description will be made regarding the yellow image formation unit 317 in detail, and description of other image formation units will be omitted.

With the yellow image formation unit 317, reference numeral 342 denotes a photosensitive drum for forming a latent image thereon due to the light from an LED array 210. Reference numeral 321 denotes a primary charger for charging the surface of the photosensitive drum 342 to a predetermined potential for preparing formation of latent images. Reference numeral 322 denotes a developing device for forming toner images by developing the latent images on the photosensitive drum 342. Note that the developing device 322 includes a sleeve 345 for applying a developing bias for developing. Reference numeral 323 denotes a transfer charger for performing discharge from the back of a transfer belt 333 so as to transfer the toner images on the photosensitive drum 342 onto a recording sheet or the like mounted on the transfer belt 333.

Next, description will be made regarding a process for forming images on a recording sheet or the like. The recording sheets stored in the cassettes 340 and 341 are supplied one by one by a pickup rollers 338 and 339, and are supplied onto the transfer belt 333 by feeding rollers 336 and 337. The supplied recording sheet is charged by a pickup charger 366. Reference numeral 368 denotes a transfer belt roller for driving the transfer belt 333, and makes up a pair along with the pickup charger 366 so as to charge the recording sheet or the like, whereby the recording sheet or the like is picked up onto the transfer belt 333. Reference numeral 367 denotes a leading-edge detector for detecting the leading edge of the recording sheet or the like on the transfer belt 333. Note that the detected signal from the leading-edge detector is transmitted to the color reader unit 200 from the printer unit 300 for using as an auxiliary scanning synchronous signal at the time of transmitting video signals from the color reader unit 200 to the printer unit 300.

Subsequently, the recording sheet or the like is transported by the transfer belt 333, and toner images are formed thereon by the image formation units 317 through 320 in the order of yellow (Y), magenta (M), cyan (C), and black (K). The recording sheet or the like output from the black image formation unit 320 is subjected to removal of charge by a charge-removal unit 349 in order to facilitate separation from the transfer belt 333, following which the recording sheet or the like is separated from the transfer belt 333. Reference numeral 350 denotes a separation charger for preventing deterioration of images due to separation discharge at the time of the recording sheet or the like separating from the transfer belt 333. The separated recording sheet or the like is charged by pre-fixing chargers 351 and 352 in order to prevent deterioration of images by assisting adsorption of the toner, following which a fixing device 334 performs thermal fixing for the toner images. Subsequently, the recording sheet or the like is transported to the finisher unit 400.

[Led Image Recording]

Figure 3:
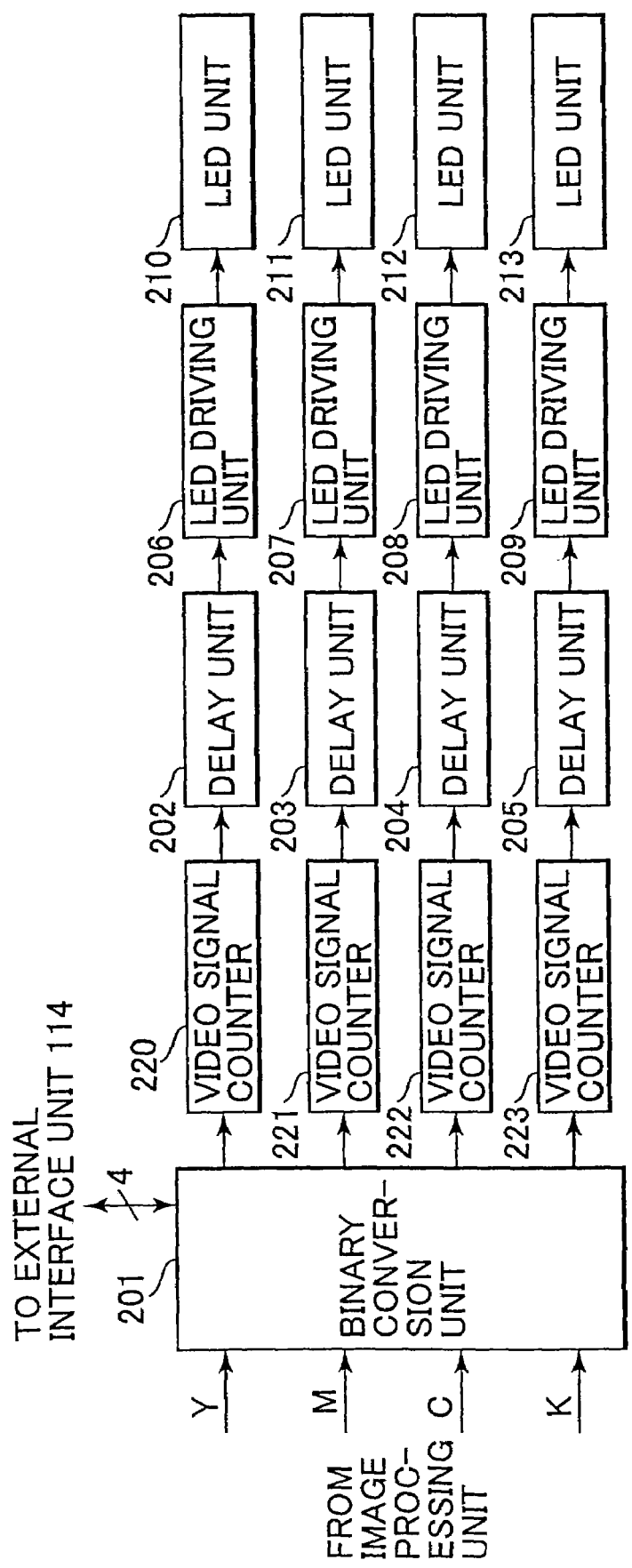
FIG. 3 is a diagram which illustrates a configuration of an LED image recording unit.

FIG. 3 is a diagram which illustrates a configuration of an LED image recording unit. As described above, the binary conversion unit 201, the video signal count units 220 through 223, and the delay unit 202 through 205 are included in the image processing unit 312. LED driving units 206 through 209 and LED units 210 through 213 are included in the image formation units of the yellow, magenta, cyan, and black, respectively.

The signals of Y, M, C, and K from the image processing unit 312 shown in FIG. 2 are converted into one-bit signals by the binary conversion unit 201, and are transmitted to the video signal count units 220 through 223 which are image information detecting means. The video signal count units 220 through 223 can count the total number of emission times of the LEDs for each color image.

Subsequently, the image signals subjected to binary processing are delayed by the delay units 202 through 205 corresponding to the distance between the leading-edge detector 367 and each of image formation positions, and are transmitted to the LED driving units 206 through 209. The LED driving units 206 through 209 generate signals for driving the LED units 210 through 213, respectively.

[Electric Configuration of the Printer Unit]

Figure 4:
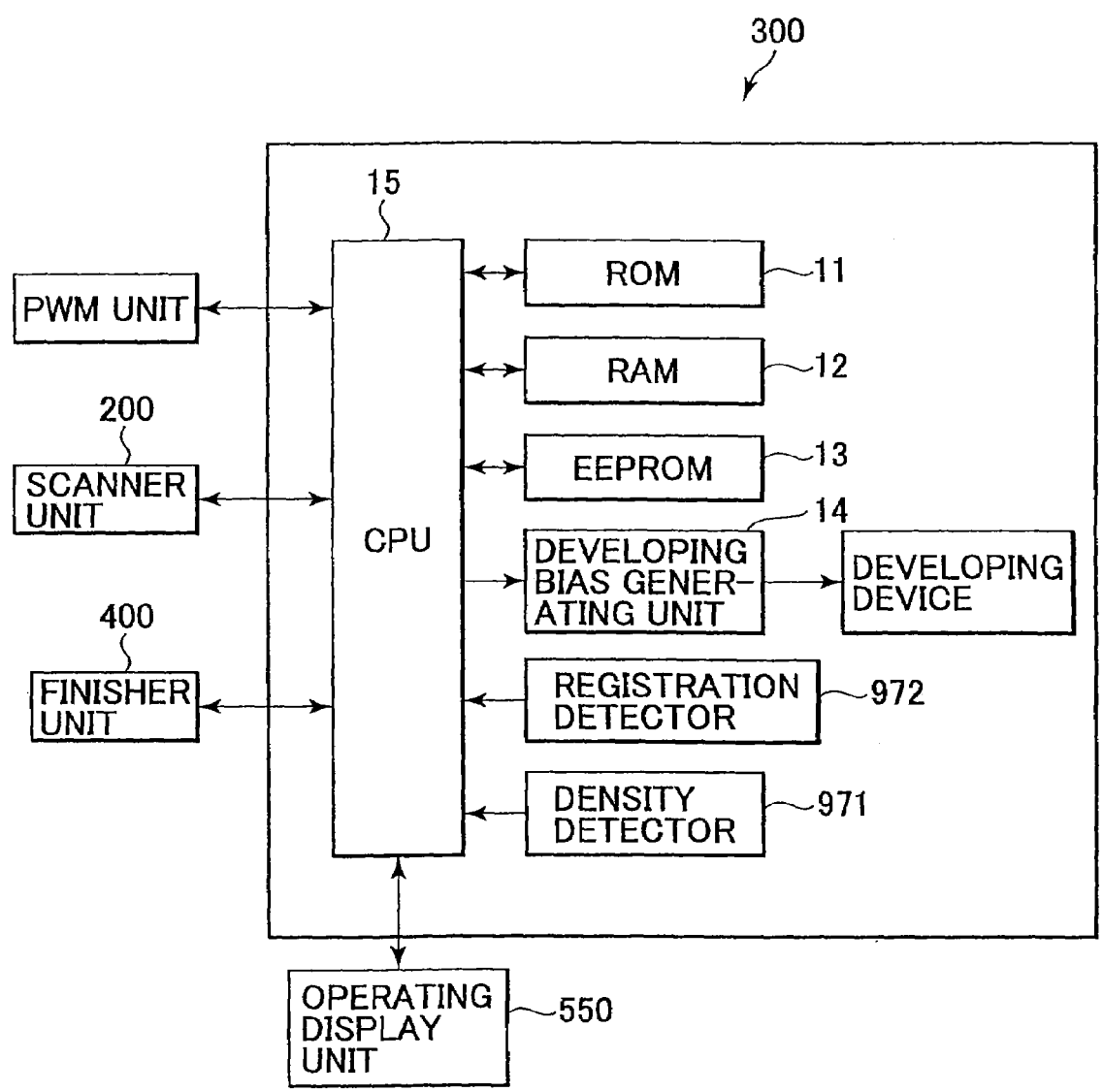
FIG. 4 is a diagram which illustrates a electronic configuration of a printer unit 300.

FIG. 4 is a diagram which illustrates an electric configuration of the printer unit 300. The printer unit 300 includes a CPU 15, ROM 11, RAM 12, EEPROM 13, a developing bias generating unit 14, a registration sensor 972, a density sensor 971, and the like. Furthermore, the CPU 15 is connected to an operating display unit 550 described later.

The ROM 11 stores programs and the like for being performed by the CPU 15. The RAM 12 temporarily stores control data for controlling the printer unit, calculated results from the CPU 15, and the like. The EEPROM (non-volatile memory) 13 stores for each adjustment item the numbers of copies (X1, X2, and so forth) from the preceding adjustment such as density adjustment, registration adjustment, and the like, up to the next adjustment as threshold values, and the numbers of copies (Y1, Y2, and so forth) from the preceding adjustment up to the present time. Furthermore, the EEPROM 13 stores adjustment values for the developing bias in the density adjustment, adjustment values for various sensors, and the like.

[Density Adjustment Processing]

Next, description will be made regarding density adjustment processing which is one of the adjustment modes (automatic adjustment or maintenance) described later. This processing is performed by the CPU 15 within the printer unit 300. In general, electrophotographic color image formation apparatuses have a problem in that, in the event that deviation of the image density occurs due to the change in the environment where the image formation apparatus is situated, the number of copies, or the like, copies cannot be made in normal color tone. With the present embodiment, density-detecting toner images (patches) P are formed on the transfer belt 333 for each color toner as test patterns (see FIG. 6), the density of each patch is detected by the density sensor 971, and image density control is performed by performing adjustment based upon the detected results.

Figure 5:
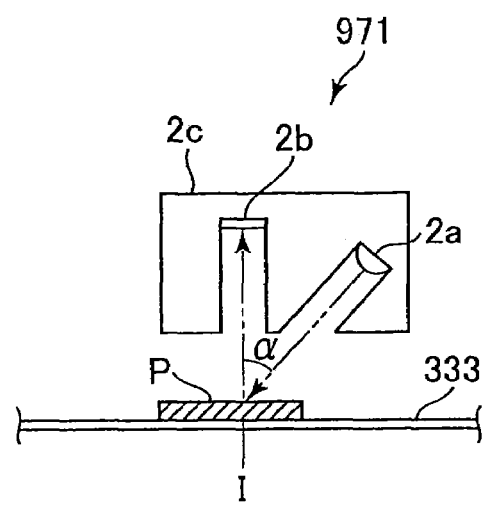
FIG. 5 is a diagram which illustrates a configuration of a density sensor.

FIG. 5 is a diagram which illustrates a configuration of the density sensor. The density sensor 971 comprises a light-emission device 2a such as an LED, a light-receiving device 2b such as a photodiode, and a holder 2c. The infrared light from the light-emission device 2a is illuminated onto the patch P on the transfer belt 333, and the reflected light from the patch P is measured by the light-receiving device 2b, whereby the density of the patch P is measured.

Note that the reflected light from the patch P includes the regular-reflection component and the diffused-reflection component. With the present invention, either a method for detecting the regular-reflection component or a method for detecting the diffused-reflection component may be employed. However, the method for detecting the regular-reflection component (see FIG. 7) has a problem in that the amount of light greatly changes due to the state of the surface of the transfer belt 333 which is a background of the patch, or the change in the distance between the density sensor 971 and the patch P, leading to difficulty in maintaining precision of detection. Accordingly, with the present embodiment, the method for detecting diffused reflected light is employed. Accordingly, as shown in FIG. 5, taking the normal I as a reference line, the density sensor 971 performs measurement with the illumination angle α onto the patch P of 45°, and the receiving angle β from the patch P of 0° so as to eliminate the regular reflected light from the light cast to the light-receiving device 2b, and so as to measure only the diffused reflected light.

Figure 6:
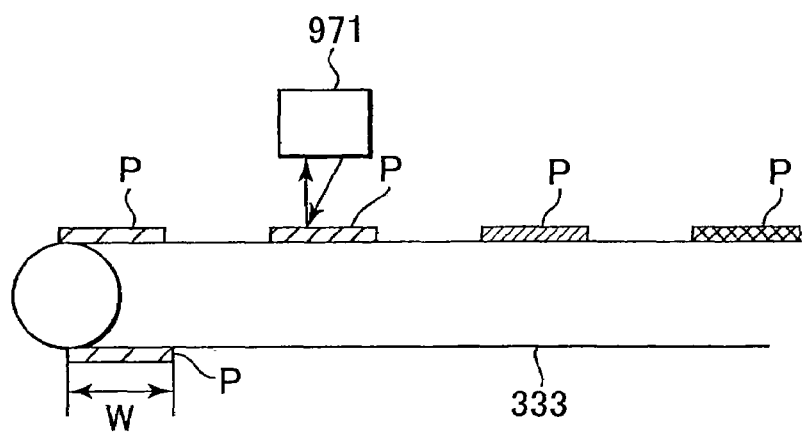
FIG. 6 is a diagram for describing the density sensor 971 detecting the density of a patch P formed on a density belt 333.

FIG. 6 is a diagram for describing the density sensor 971 detecting the density of the patch P formed on the transfer belt 333. With the actual density detecting method for the patch P, a square pattern with the width of 14 mm and the height of 14 mm is employed as a pattern of the patch P. The patch pattern is a half-tone pattern subjected to a predetermined dithering processing. Taking the pattern formed by full exposure as 100%, the pattern employed in the present embodiment corresponds to around 60%.

Developing is performed with the developing bias generated by the developing generating unit 14 being changed for each predetermined spacing so as to form multiple patch patterns, and the density of each patch pattern is detected by the density sensor 971. The developing bias for forming a patch pattern with a predetermined density is calculated based upon the detected values. The bias value is calculated for each color, and the calculated developing bias values are used at the time of image formation. Such control is referred to as "developing bias control".

Furthermore, an arrangement may be made wherein developing is performed with a calculated and fixed developing bias value for a half-tone pattern subjected to a predetermined dithering processing with the tone (exposure amount) changed for each constant spacing so as to form multiple patch patterns, and the density of each patch pattern is detected by the density sensor 971. Furthermore, an arrangement may be made wherein the exposure amount is corrected at the time of dithering processing so as to obtain smooth tone based upon the detected values. The control is referred to as "half-tone control".

Note that the density of the patch pattern is calculated from subtraction of the signal values of the reflected light from only the background of the electrostatic transporting belt measured prior to density control from the signal values of the reflected light from the patch pattern formed on the belt.

The image density control is preferably performed at the time of turning the power supply on, at the time of replacement of expendables such as cartridges or the like, at the time of the number of copies reaching a predetermined number after performing the preceding image density control, or the like. Furthermore, the image density control may be performed following adjustment instructions from the operation display unit 550 described later at a timing specified by the user. Furthermore, the image density control may be performed at a timing performed according to a flowchart described later.

[Registration Adjustment Processing]

Next, description will be made regarding to the registration adjustment processing which is one of the adjustment modes (automatic adjustment or maintenance) described later. The image formation apparatus includes the registration sensor 972 (see FIG. 7) at the portion facing the transfer belt 333 within the main unit thereof. The tandem color image formation apparatus according to the present embodiment transfers toners in four colors onto the transfer member for each color, and mixes these color toners at the time of fixing so as to reproduce color images. That is to say, in the event that the colors are not overlaid in a precise manner at the time of transferring the toners onto the transfer member, color images cannot be obtained with the normal color tone.

Accordingly, with the present embodiment, registration detecting toner images (lines) are formed on the transfer belt 333 for each color toner as test patterns, the transfer position is detected by the registration sensor 972 for each color, and the start timing of formation of the electrostatic latent image by the laser scanning and exposure is adjusted based upon the detected results. The above-described processing is referred to as "registration control".

The same optical density sensor as with the density sensor 971 can be employed as the registration sensor 972. Note that with the registration control, the transfer position is detected from the change in the amount of the received light at the time of the line passing through the field of view of the registration sensor 972, and the start timing of formation of the electrostatic latent image is corrected with regard to time based thereupon.

Figure 7:
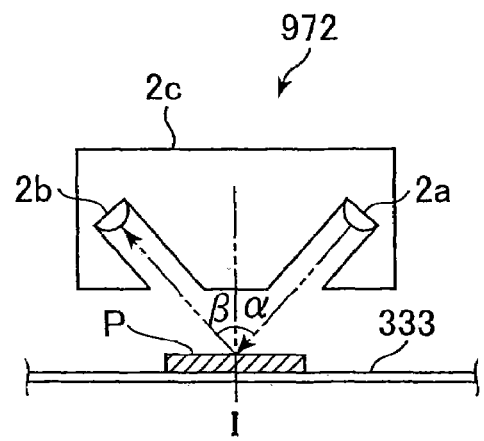
FIG. 7 is a diagram which illustrates a configuration of a registration sensor.

Note that the image density control is performed in order to detect the difference in the density between the patches, and accordingly, the method of detecting the diffused reflection component is employed for obtaining stable detection of the reflected light. However, the registration control is performed in order to detect the change in the absolute value of the light amount at the time of the line passing through the field of view of the registration sensor, the registration sensor employing the regular-reflected-light detecting method, shown in FIG. 7, using the regular reflected light which has a great absolute value, is employed. FIG. 7 is a diagram which illustrates a configuration of the registration sensor.

That is to say, taking the normal I as a reference line, the registration sensor 972 performs measurement with the illumination angle $\alpha$ onto the patch P of 45°, and the receiving angle $\beta$ from the patch P of 45°. As a result, the registration sensor 972 measures both the diffused reflected light and the regular reflected light, but the regular reflection component is incomparably greater than the diffused reflection component, and accordingly, contribution of the diffused reflection component is negligible. Note that either of the reflected-light detecting methods may be employed for the density detection and the registration detection. Accordingly, an arrangement may be made wherein both the density detection and the registration detection are performed using only one optical density sensor employing either the regular-reflected-light detecting method or the diffused-reflected-light detecting method for reducing costs.

The registration control is preferably performed at the time of the power supply being turned on, at the time of replacement of expendables such as a cartridge, electrostatic transporting belt, or the like, at the time of the number of copies reaching a predetermined number after performing the preceding registration control, or the like. Furthermore, the registration control may be performed at a timing specified by the user according to adjustment instructions from the operating display unit 550 described later.

[Configuration of the Finisher Unit 400]

Figure 8:
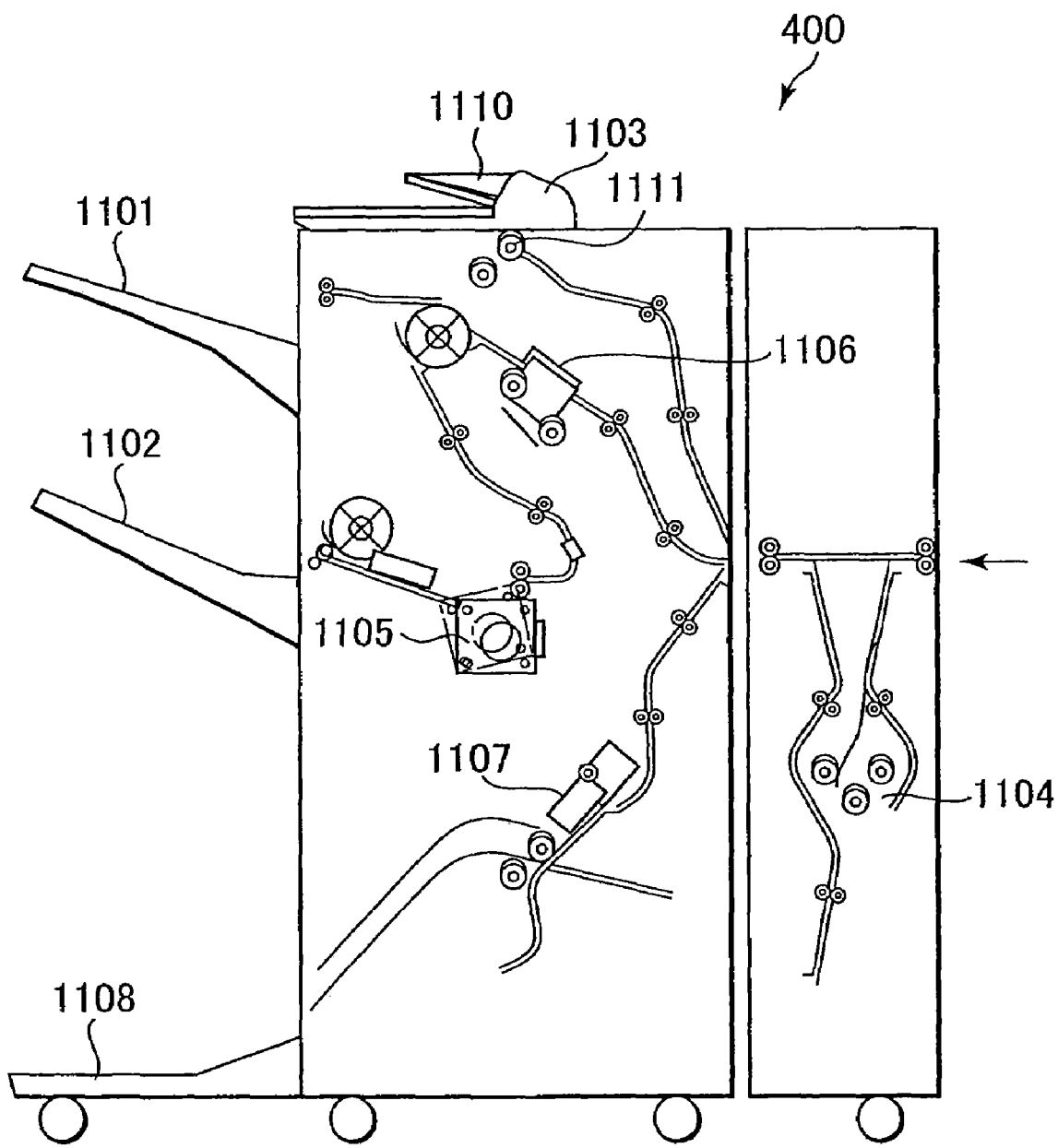
FIG. 8 is a diagram which illustrates a configuration of a finisher 400.

FIG. 8 is a diagram which illustrates a configuration of the finisher unit 400. The sheet output from the fixing unit 334 of the printer unit 300 is transported to the finisher unit 400. The finisher unit 400 includes a sample tray 1101 and a stack tray 1102, for switching to a suitable tray according to the type of the job or the number of sheet which are to be discharged.

Two types of sort methods are known. One is the bin sort method wherein output sheets are distributed to multiple bins. The other is the shift sort method wherein output sheets are distributed for each job using the electronic sort function with the bin or the tray being shifted inwards. Thus, sorting can be realized. The electronic sort function is also referred to as a "collating function", wherein the document stored in large-size buffer memory included in the core unit is output in a desired page number order, so as to support sorting.

The group function is a function for distributing output sheets for each page, while sorting is a function for distributing output sheets for each job. Furthermore, an arrangement may be made wherein the output sheets which are to be discharged to the stack tray 1102 are stored for each job, and the stored sheets are bound by a stapler 1105 for each job immediately prior to discharging.

Furthermore, the finisher unit 400 includes a Z-folding device 1104 for folding a paper sheet in the shape of the letter Z, and a puncher 1106 for punching two or three holes for filing, on a path up to the aforementioned two trays. Each processing is performed according to the type of the job.

Furthermore, a saddle stitcher 1107 binds the output sheets at two portions on the center thereof, following which the sheets are nipped by the roller at the center portion thereof so as to form a booklet in folio such as a magazine, pamphlet, or the like. The booklet formed of the sheets bound by the saddle stitcher 1107 is discharged onto a booklet tray 1108. Furthermore, an arrangement may be made wherein gluing is performed for binding the sheets into a booklet, or an arrangement may be made wherein trim is performed so as to true up the end face opposite to the binding side after binding (both not shown).

An inserter 1103 transports sheets set on a tray 1110 to any of the trays 1101, 1102, and 1108, without passing through the printer. Thus, the sheet set to the inserter 1103 can be inserted between the sheets which are to be transported to the finisher unit 210.

Upon the user setting the sheets face up on the tray 1110 of the inserter 1103, the sheets are supplied by a pickup roller 1111 in order from the topmost sheet. The sheets are transported directly from the inserter 1103 to the tray 1101 or tray 1102, and are discharged face down. In the event of transporting the saddle stitcher 1107, the sheets are temporarily transported to the puncher 1106, following which the sheets are transported to the saddle stitcher 1107 so as to match the face direction of the sheets.

[Operating Display Unit]

Figure 9:
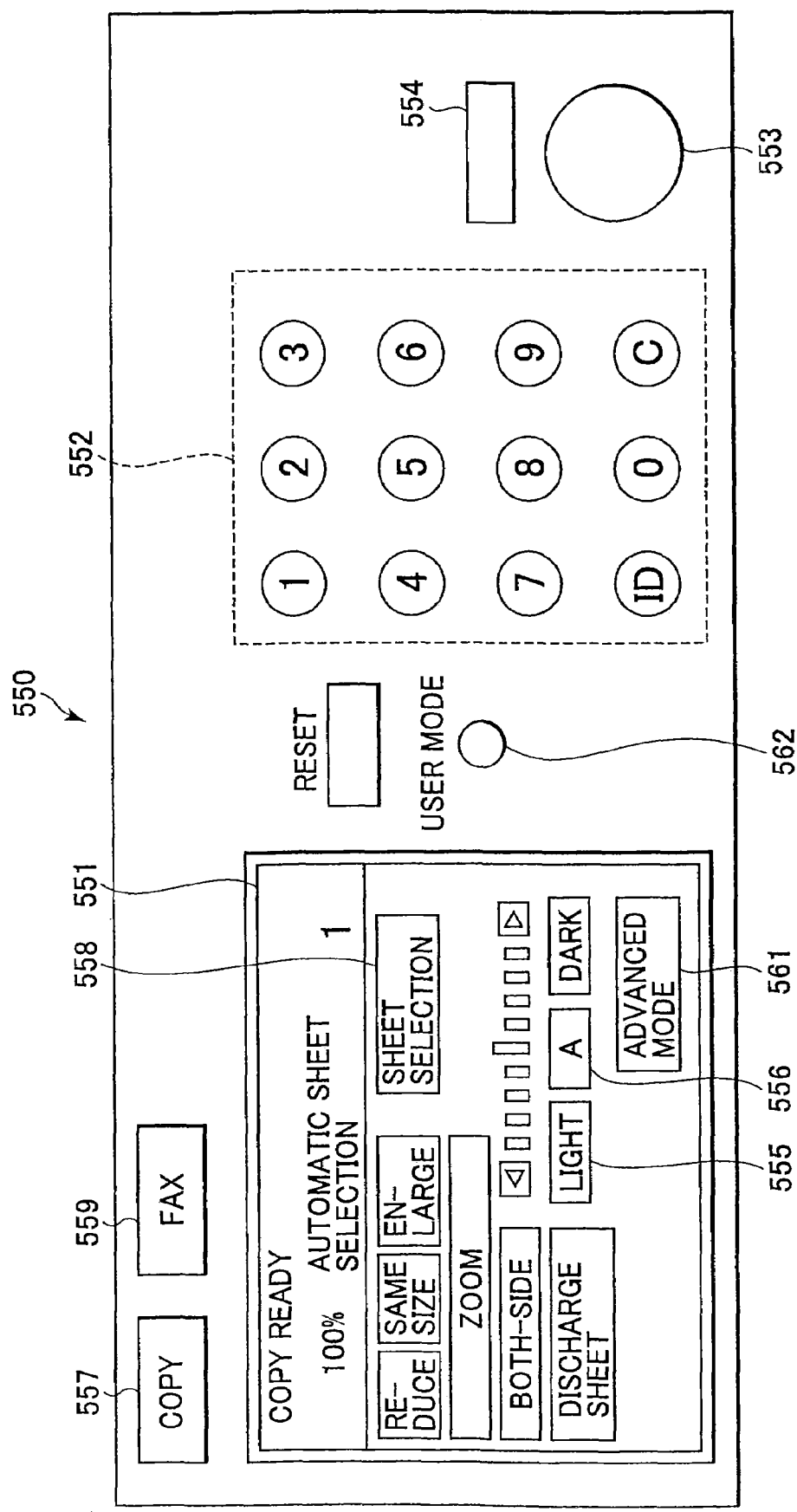
FIG. 9 is a diagram which illustrates an external view of an operation display unit 550.

FIG. 9 is a diagram which illustrates an external view of the operating display unit 550. The operating display unit 550 includes various kinds of key groups and a LCD (liquid crystal display) 551. The LCD 501 is formed of a touch panel of which the surface is transparent. Various kinds of messages can be displayed on the LCD 501, and furthermore, various kinds of input keys are displayed so that the user can input commands by pressing the input keys displayed thereon.

Of the input key groups, reference numeral 552 denotes a numerical keypad for inputting values such as the number of copies. Reference numeral 553 denotes a copy start key for starting copy. Reference numeral 554 denotes a stop key for stopping copy operations.

Reference numeral 555 denotes a copy density key for adjusting the copy density manually. Reference numeral 556 denotes an AE key for switching to the automatic mode wherein the copy density is automatically adjusted according to the density of the document, or canceling AE (automatic density adjustment) and switching to the manual mode wherein the copy density is manually adjusted.

Reference numeral 557 is a copy mode key for entering the copy mode. Note that the image formation apparatus includes the copy queuing function wherein upon the user setting the following document onto the document feeder (DF) 302 following the preceding document being read out, the document can be read out and queued as a next copy job, even during printout for the previous job. Reference numeral 559 denotes a fax mode key for performing the fax function.

Reference numeral 558 denotes a cassette selection key (sheet selection key) for selecting the upper cassette 341 or the lower cassette 340. In the event that the document is placed on the document feeder (DF) 302, the user can select APS (automatic paper selection) with the cassette selection key 558. In the event that APS is selected, the image formation apparatus automatically selects a cassette storing sheets of the same size as the document. Reference character 562 denotes a user mode key for the user changing the settings of the present image formation apparatus. The settings which can be changed by the user include how long the input settings are to be held from the time of the setting being input (the input settings are automatically cleared after this period), default settings of the mode at the time of the reset key being pressed, and the like, for example.

Reference numeral 562 denotes a key for selecting an operation mode for the finisher 400. Upon the user pressing the key 562, the LCD 551 displays the screen for selecting the staple mode, folding mode, or the like. Reference numeral 561 denotes an advanced mode key for performing settings of the advanced modes such as settings of the binding margin, photographic mode, multiple processing, dual page copying, 2 in 1 mode, and so forth.

[Adjustment Processing]

Figure 10:
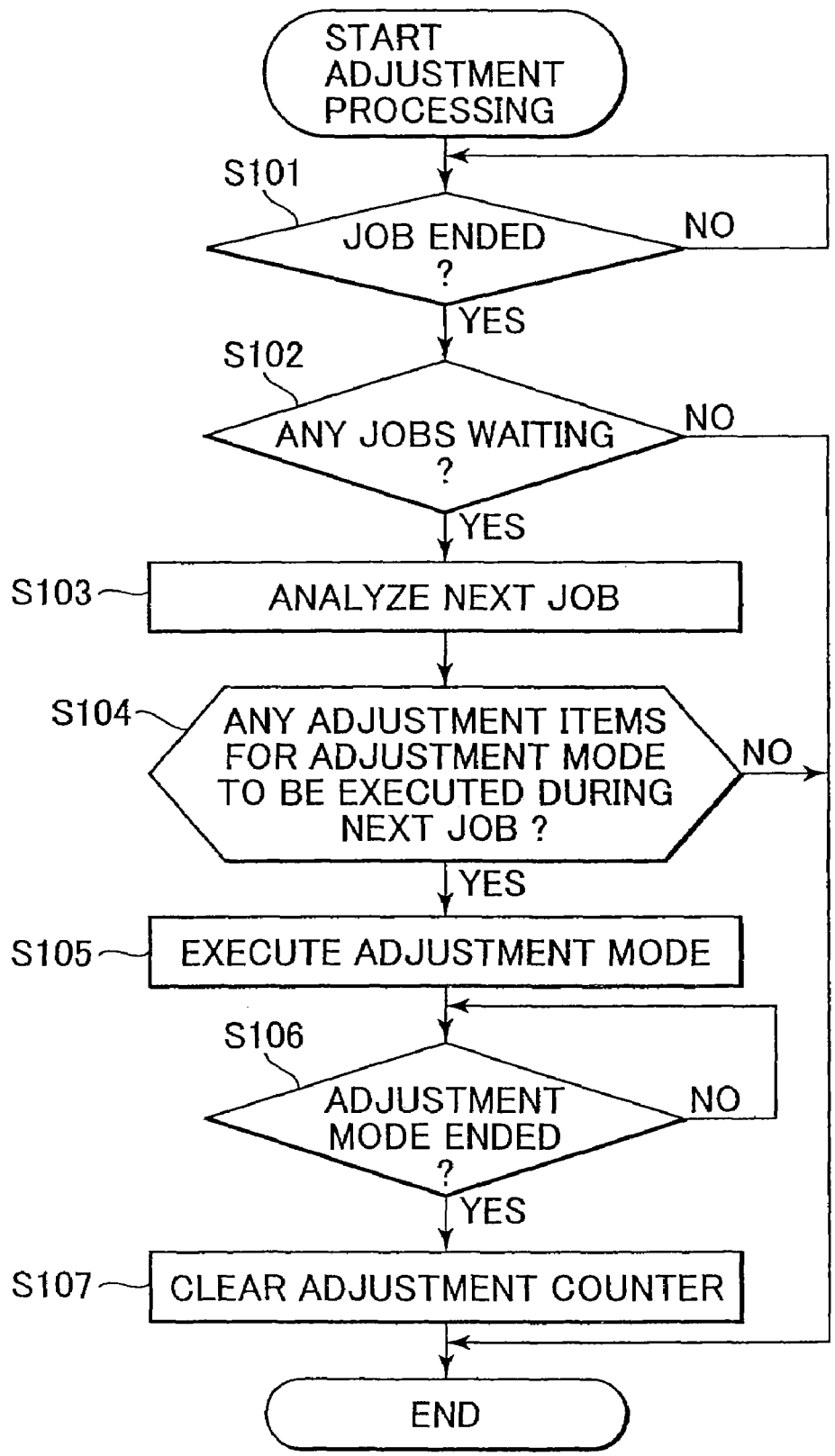
FIG. 10 is a flowchart which shows steps for execution processing for the adjustment mode.

FIG. 10 is a flowchart which illustrates the processing steps executed for an adjustment mode. The processing program is stored in the ROM 11 within the printer unit, and is executed by the CPU 15. First, determination is made whether or not the job has ended (Step S101). In the event that the job has not ended, the processing in Step S101 is repeated. In the event that the job has ended, determination is made whether or not there are any subsequent jobs queued (Step S102). In the event that there are no subsequent jobs queued, the present processing ends.

On the other hand, in the event that there is a subsequent job queued, the image formation apparatus checks the details of the next job (Step S103). FIG. 11 shows a table indicating the queuing of the jobs. Here, the job 1 is running at the present time, job 2 is for printing 100 pages×2 copies, and job 3 is for printing 10 pages×50 copies. The number of total printing pages is confirmed in the analysis of the details of the next job.

Subsequently, determination is made whether or not the image formation apparatus has any adjustment items for the adjustment mode executed during the next job (Step S104). The determination is made as follows. With the threshold value for determining the time of next adjustment from the time of the preceding adjustment as X, and with the number of total copies from the time of the preceding adjustment up to the present time as Y (present count), the number of the remaining copies, which can be performed up to the next adjustment, is represented by X−Y. Note that the parameters such as the aforementioned threshold value X, present count Y, and the like, are stored in the EEPROM 13. With the number of total copies for the next job as Z, in the event that the relation represented by Expression (1) holds, the image formation apparatus determines that the total number of copies reaches the threshold for executing the adjustment mode during the next job.

$$Z > X - Y \quad (1)$$

FIG. 12 shows a table indicating the threshold values X, present count Y, remaining number of pages, and the like, for each adjustment item. As specific examples of the adjustment items, the density adjustment and the registration adjustment are shown in the table, but each image formation apparatus has particular adjustment items, and accordingly, it is needless to say that the adjustment items are not restricted to the examples.

In this table, the threshold values X are set to 500 pages for both adjustment modes. These threshold values are set to particular values for each image formation apparatus, but the user can change the threshold values with the operation display unit 550. In addition, the number of pages printed (present count) Y from the time of the preceding adjustment up to the present time are 450 pages and 200 pages for the density adjustment and the registration adjustment, respectively. Accordingly, the remaining number of pages (X−Y) wherein copies can be performed up to the next adjustment are 50 pages and 300 pages, respectively. Furthermore, the number of the total copies Z for the next job is 200 pages corresponding to the job 2 of the queued jobs shown in FIG. 11. Accordingly, the image formation apparatus determines whether or not the number of pages printed will reach the threshold for performing the adjustment mode during the next job by making determination whether or not the relation of Expression (1) holds. Here, the above-described relation holds with regard to the item of the density adjustment, and accordingly, the image formation apparatus determines that the number of pages printed will reach the threshold for executing the density adjustment during the next job. On the other hand, the above-described relation does not hold with regard to the item of the registration adjustment, and accordingly, the image formation apparatus determines that the number of pages printed will not reach the threshold for executing the adjustment mode during the next job.

In Step S104, in the event that determination is made that there are no adjustment mode items to be executed during the next job, the present processing ends. On the other hand, in the event that determination is made that the image formation apparatus has an item for the adjustment mode executed during the next job, the corresponding adjustment mode is executed (Step S105). As described above, here, the density adjustment mode is executed. Subsequently, determination is made whether or not the adjustment mode has ended (Step S106). In the event that determination is made that the adjustment mode has not ended, the processing in Step S106 is repeated. On the other hand, in the event that determination is made that the adjustment mode has ended, the corresponding present count Y (in this case, the count value for the density adjustment) is cleared (Step S107). Subsequently, the present processing ends.

In general, there is some time between the individual jobs for operations performed by the user, such as picking up the discharged sheets from the stack tray or the booklet tray of the finisher 400, supplying sheets for the next job, or the like. With the present embodiment, the adjustment mode of the adjustment item, wherein determination is made that the number of printed pages reaches the threshold for executing the adjustment mode during the next job, is executed between the individual jobs beforehand, thereby reducing the downtime during the job, and reducing the number of times of adjustment. Furthermore, adjustment is not executed during the job, thereby preventing difference in image quality between the copies before and after the execution of the adjustment mode within a single job. Furthermore, with the present embodiment, the adjustment mode is executed between the individual jobs, and accordingly, the adjustment mode is executed around the threshold for executing the adjustment mode, thereby obtaining excellent image quality.

Second Embodiment

Figure 13:
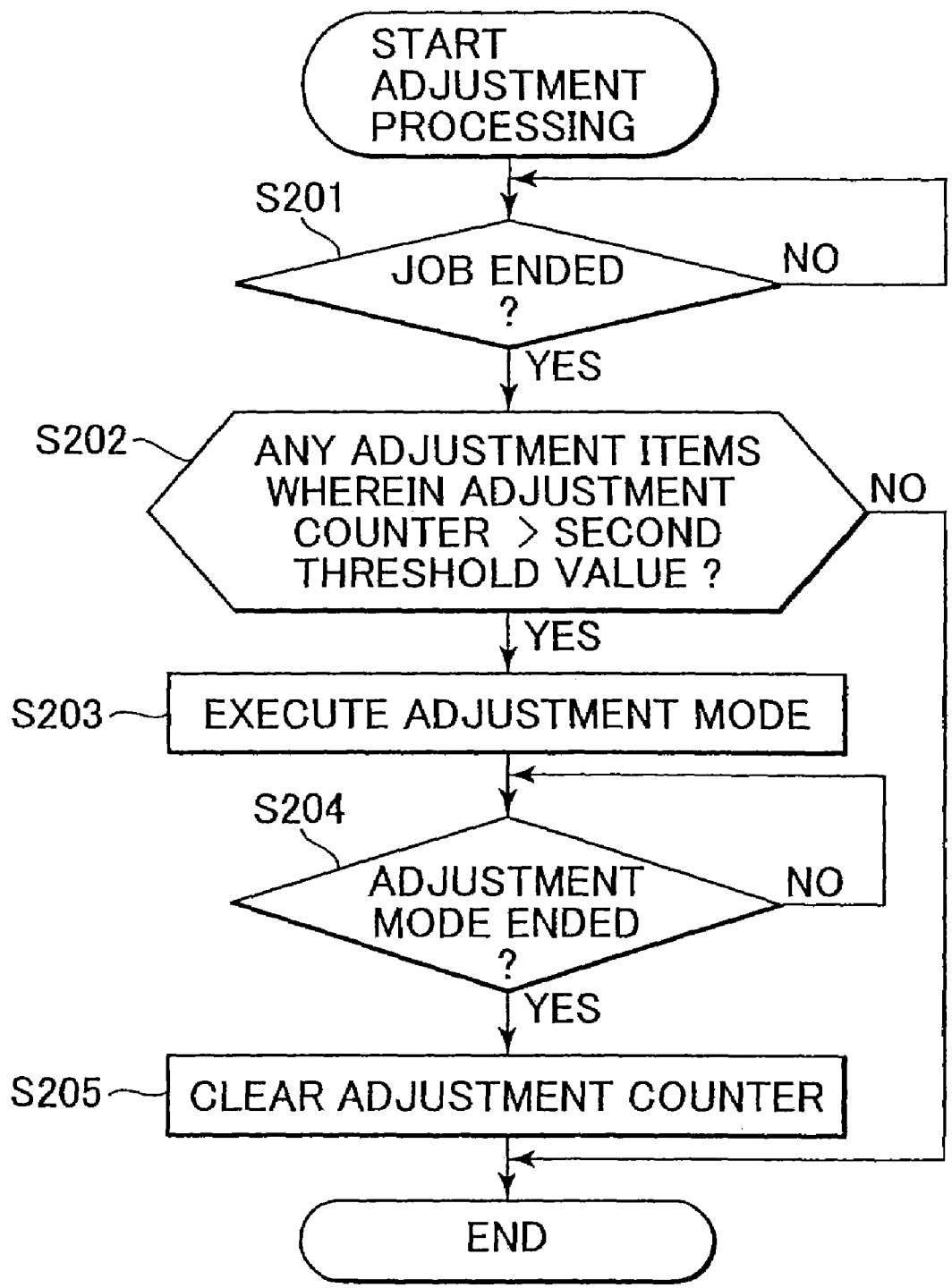
FIG. 13 is a flowchart which shows steps for execution processing for the adjustment mode according to a second embodiment.

FIG. 13 is a flowchart showing the processing steps executed for the adjustment mode according to a second embodiment. The processing program thereof is stored in the ROM 11 within the printer unit, and is executed by the CPU 15. First, determination is made whether or not the job has ended (Step S201). In the event that determination is made that the job has ended, the processing in Step S201 is repeated, otherwise determination is made whether or not the present count Y for each adjustment item is greater than the second threshold value X2 (Y>X2) (Step S202).

Figures 14, 15:
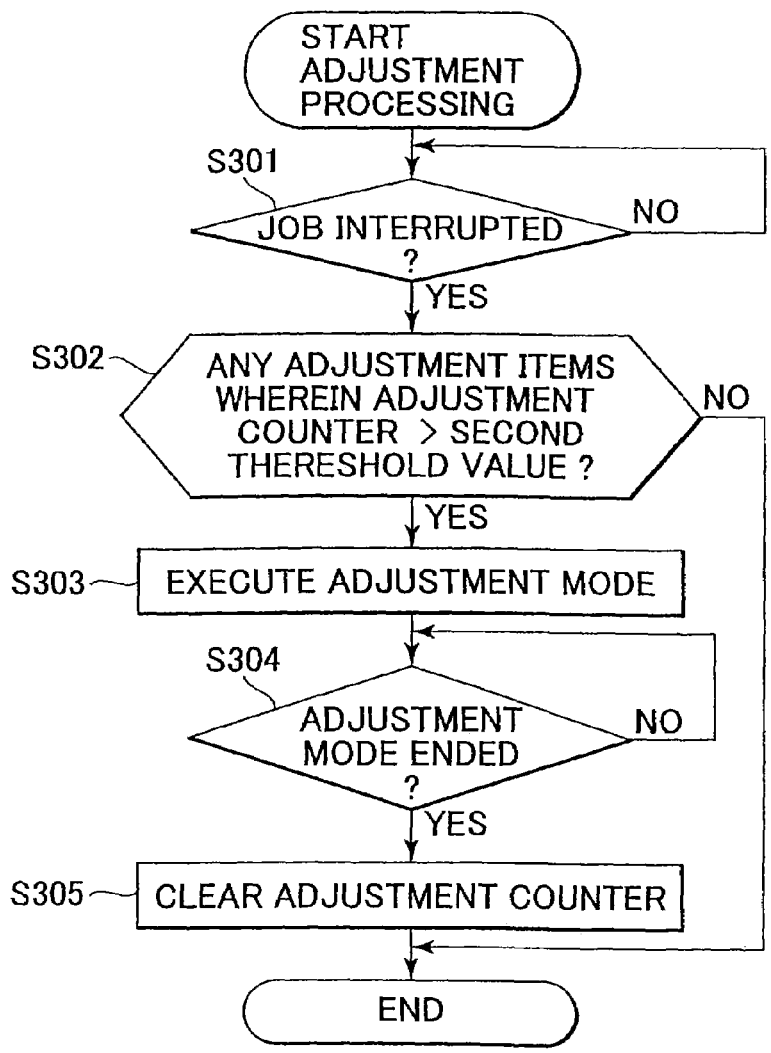
FIG. 14 shows a table which indicates a threshold value X, a second threshold value X2, and a present count value Y, for each adjustment item.
FIG. 15 is a flowchart which shows steps for execution processing for the adjustment mode according to a third embodiment.

Note that the second threshold value X2 can be input by the user with the operation display unit 550, and is set to a value smaller than the threshold value (X) by a predetermined value. FIG. 14 shows a table indicating the threshold values (X), the second threshold values X2, and the present count values Y, for each adjustment item. In an example of the present embodiment, the second threshold values X2 is smaller than the threshold value X by 50 pages, respectively. Note that an arrangement may be made wherein the second threshold value X2 is automatically updated according to the details of the job in a predetermined period.

In Step S202, in the event that determination has been made that all the present count values Y of the adjustment items are equal to or less than the second threshold values X2, respectively, the present processing ends. In this example, only the present count Y of the registration adjustment is less than the second threshold value X2 (Y<X2), and the present count Y of the density adjustment is greater than the second threshold value X2 (Y>X2).

In Step S202, in the event that determination is made that at least one of the present count values Y of the adjustment items is greater than the second threshold value X2, the corresponding adjustment mode (in this case, the density adjustment mode) is executed (Step S203). Note that in the event that the image formation apparatus has multiple required adjustment modes, the multiple adjustment modes are consecutively executed. Subsequently, the image formation apparatus waits for the processing to end (Step S204). In the event that the execution of the adjustment mode has ended, the present count Y is cleared in Step S205, and the present processing ends.

As described above, with the present embodiment, the user can set and change the second threshold values, and accordingly, the adjustment items for the adjustment modes which might be executed during the next job depending upon the density of a printout such as a character printout, solid picture printout, or the like, are found beforehand, and are executed before starting the job. Thus, the downtime during the job is reduced, and the number of times of adjustment is reduced.

Third Embodiment

FIG. 15 is a flowchart which shows the processing steps executed for the adjustment mode according to a third embodiment. The processing program thereof is stored in the ROM 11 within the printer unit, and is executed by the CPU 15. First, determination is made whether or not the job has been interrupted (Step S301). Here, interruption of the job means that the job has been interrupted to supply sheets, supply staples for the finisher, pick up the output sheets following detection of the stack tray being full, or the like, during the job.

In the event that determination is made that the job has not been interrupted, the processing in Step S301 is repeated. On the other hand, in the event that determination is made that the job has been interrupted, determination is made whether or not at least one of the present count values Y of the adjustment items is greater than the second adjustment value X2 (Step S302). Detailed description regarding the second threshold values X2 and the step processing has been made in the above second embodiment, so description thereof will be omitted.

In the event that all the present count values Y of the adjustment items are equal to or less than the second threshold values X2, respectively, the present processing ends. On the other hand, in the event that at least one of the present count values Y of the adjustment items is greater than the second threshold value X2, the corresponding adjustment mode is executed (Step S303). In FIG. 14, the item of the density adjustment matches the criteria, and accordingly the density adjustment mode is executed. Note that in the event that there are multiple required adjustment modes, the other required adjustment modes are consecutively executed.

Subsequently, determination is made whether or not the adjustment mode has ended (Step S304). In the event that the adjustment mode has not ended, the processing in Step S304 is repeated, otherwise the present count Y is cleared (Step S305). Subsequently, the processing ends.

With the present embodiment, any adjustment item of an adjustment mode which might be executed during the job can be found even during the job, and the required adjustment mode is executed during an interruption of the job, and accordingly, the brief periods during interruption of jobs can be efficiently used, thereby reducing the downtime during the job, and reducing the number of times of adjustment.

Fourth Embodiment

Description has been made regarding the second threshold values X2 which have been set by the user with the operation display unit 550 in the above second and third embodiments. With a fourth embodiment, the image formation apparatus determines the threshold values based upon the details of the jobs in a predetermined period, and the threshold values are automatically updated.

Figure 16:
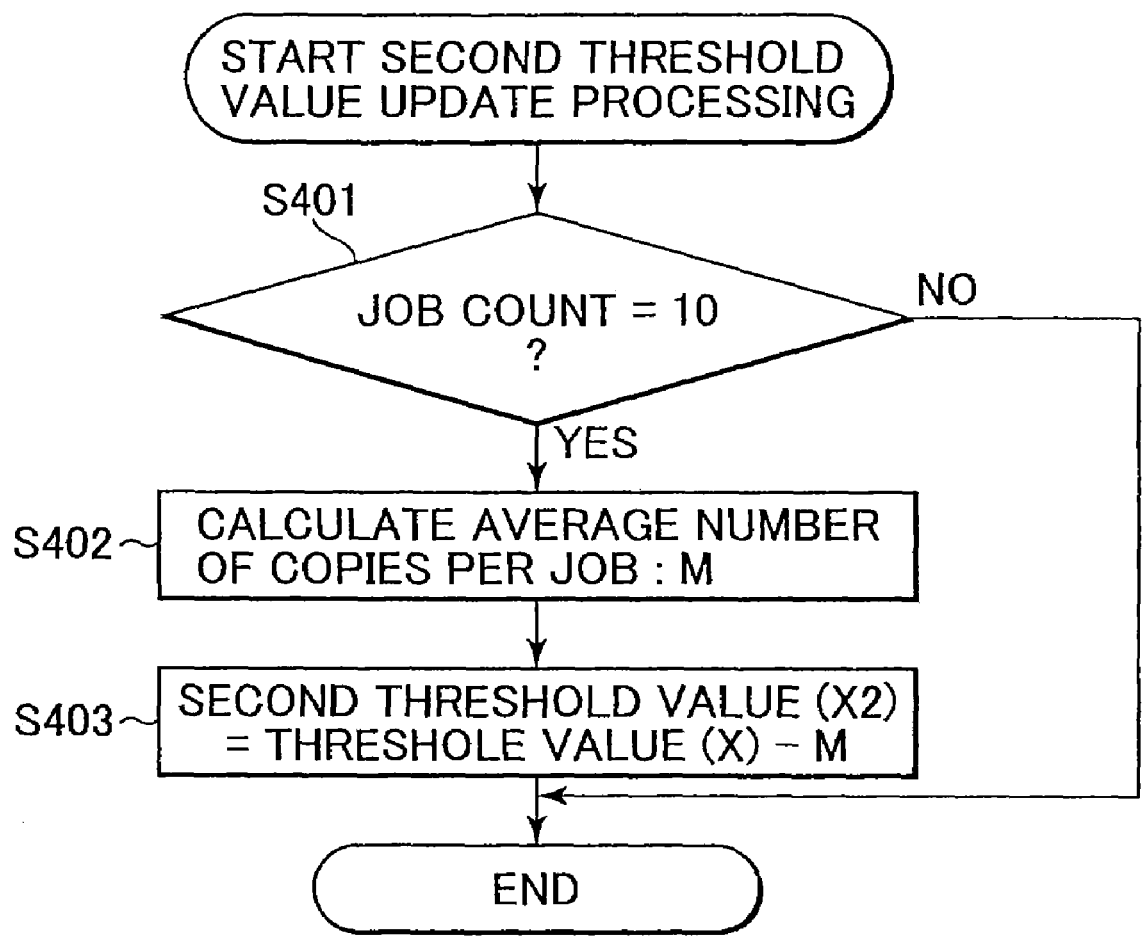
FIG. 16 is a flowchart which shows steps for update processing for the second threshold value according to a fourth embodiment.

FIG. 16 is a flowchart which shows the steps for updating the second threshold values according to the fourth embodiment. The processing program thereof is stored in the ROM 11 within the printer unit, and is executed by the CPU 15. First, determination is made whether or not the job count value has reached a predetermined value (Step S401). In an example of the present embodiment, the aforementioned predetermined value is set to ten, and accordingly, the second threshold values X2 are updated every 10 jobs.

In the event that the job-count value has not reached the predetermined value, the processing ends. On the other hand, in the event that the job-count value has reached the predetermined value, M which is the average number of pages printed per job is calculated based upon the job history of previous jobs for a predetermined number of times (Step S402). Subsequently, the second threshold values X2 are calculated using the Expression (2), and the parameters X2 stored in the EEPROM 13 are updated (Step S403). Subsequently, the processing ends.

$$\text{Second threshold value }(X2)=\text{Threshold value }(X)-M \qquad (2)$$

Note that while description has been made regarding processing wherein the second threshold values are updated once every predetermined number of times of jobs being executed, an arrangement may be made wherein the average number of pages printed per job is calculated once every predetermined time period, e.g., once a week.

With the present embodiment, optimal second threshold values can be set according to the recent use of the image formation apparatus, thereby preventing excessive adjustment processing.

Fifth Embodiment

Description has been made regarding the processing wherein the second threshold value is determined by calculating the average number of pages printed (M) per job based upon the job history for the previous jobs in the predetermined number of times in the above fourth embodiment. With a fifth embodiment, the video count values per job is calculated, and the second threshold value is determined based thereupon.

In general, the image density is detected for each image formation in a print job. With the present embodiment, the image density is represented by the number of total emission times of the LEDs counted by the video signal count units 220 through 223 for each color image (see FIG. 3).

Figure 17:
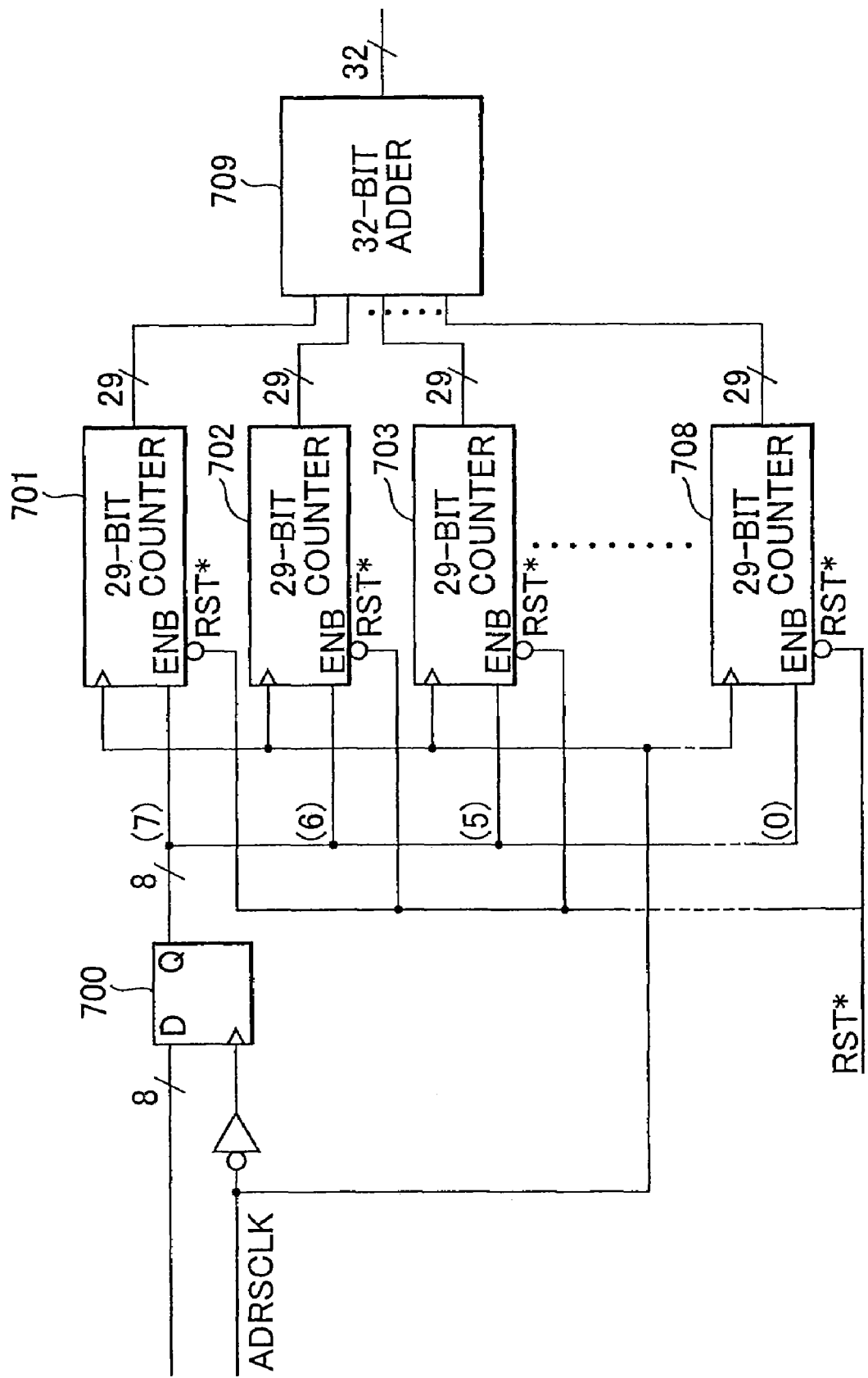
FIG. 17 is a circuit diagram which illustrates a configuration of a video signal count unit 220.

FIG. 17 is a circuit diagram which shows a configuration of the video signal count unit 220. Note that the video signal count units 221 through 223 have the same configuration, so only the configuration of the video signal count unit 220 will be described. The video signal count unit 220 receives image signals 700 from the binary conversion unit 201, and the image signals of one image are counted as 8-bit data by 29-bit counters 701 through 708 in parallel. Addition of these results is made by a 32-bit adder 709, whereby the number of total emission times of the LEDs is obtained as 32-bit data from the addition result.

Such processing is performed for each image formation in order to obtain the number of total emission times of the LEDs (which will be referred to as "video count value hereafter), and addition of the video count values is made for the total number of pages over one job, which will be referred to as "Vsum" hereafter. The addition of the Vsum is made over a predetermined number of job times, and the addition is divided by the total number of pages for the predetermined number of job times, whereby the average video count value per page AVsum is obtained. The greater the image density of the printed image is, the greater the AVSum is. Accordingly, with the present embodiment, with the AVsum for a solid image as Vmax, determination is made whether or not the AVsum is greater than $(\frac{1}{2})*Vmax$ so as to determine the second threshold.

FIG. 18 shows a table which indicates the second threshold values. The second threshold values are determined using the table shown in FIG. 18. Thus, in the event that the image density of the printed image is close to that of the complete solid image, the image formation apparatus according to the present embodiment increases the frequency of adjustment.

As described above, the image formation apparatus according to the above embodiments has the advantages described below. In general, there is some time between the individual jobs for the operation performed by the user, such as picking up the discharged sheets from the stack tray or the booklet tray of the finisher 400, supplying sheets for the next job, or the like. With the above embodiments, the adjustment mode of an adjustment item wherein the determination parameter for executing the adjustment will reach the threshold value during the next job is executed between the individual jobs beforehand, thereby reducing the downtime during the job, and reducing the number of times of adjustment.

Furthermore, the user can set the second threshold value, which is smaller than the first threshold value, for determining adjustment executed between the individual jobs. With the above embodiments, an adjustment mode wherein determination parameter for executing the adjustment could reach the threshold value during the next job is executed prior to the job, thereby reducing the downtime during the job, and reducing the number of times of adjustment.

Furthermore, with the above embodiments, the user can set the second threshold value which is smaller than the first threshold value, and accordingly, in the event that the job is interrupted due to supplying sheets, supplying staples for the finisher, detection of the stack tray being full, or the like, the adjustment mode wherein determination parameter for executing the adjustment could reach the threshold value during this job is executed during interruption of the job, and accordingly, the brief periods during interruption of jobs can be efficiently used, thereby reducing the downtime during the job, and reducing the number of times of adjustment.

Furthermore, with the above embodiments, the user can input the second threshold values with the operation display unit, and accordingly, the user can freely set the second threshold according to the details of the jobs which are normally performed, thereby improving ease of use of the image formation apparatus.

Furthermore, with the above embodiments, the second threshold values are automatically updated according to the details of the jobs in a predetermined period. Thus, the second threshold values are set to optimal values corresponding to use of the image formation apparatus, thereby preventing excessive execution of adjustment modes.

While description has been made regarding the embodiments according to the present invention, the present invention is not restricted to the above-described embodiments, and the present invention may be applied to any configuration included within scope of the appended claims, or any configuration which can achieve the functions included in the above-described embodiments.

For example, the second threshold values used in the above-described second and third embodiment may be set to the same value or different values for each adjustment item.

While description has been made in the above-described embodiments regarding adjustment item as a type of maintenance, and the density adjustment and the registration adjustment as specific examples, actual maintenance further includes various types of items. That is to say, the maintenance according to the present invention should be understood in the broad sense, and encompasses not only adjustment of the component, which means maintenance in the general sense, but also cleaning, replacement and supply of expendables, and the like. Accordingly, the processing of each embodiment may be applied to cleaning, replacement and supply of expendables, and the like, as well. Examples of cleaning include cleaning of the document table glass, cleaning of the transporting belt, and the like. Example of replacement of expendables include replacement of a cleaning blade or a charger. Examples of supply include supplying of toner, supply of sheets, and the like.

As described above, with the above-described embodiments, adjustment mode can be executed at a suitable timing. That is to say, the adjustment mode is executed between the individual jobs, thereby reducing the downtime during the job, and reducing the number of times of adjustment. Furthermore, with the above-described embodiments, the adjustment mode wherein the determination parameter could reach the threshold value during the next job is executed prior to the job, thereby reducing the downtime during the job, and reducing the number of times of adjustment. Furthermore, brief periods during interruption of jobs is efficiently used for adjustment, thereby reducing the downtime during the job, and reducing the number of times of adjustment.

Sixth Embodiment

[Schematic Configuration of the System]

Figure 19:
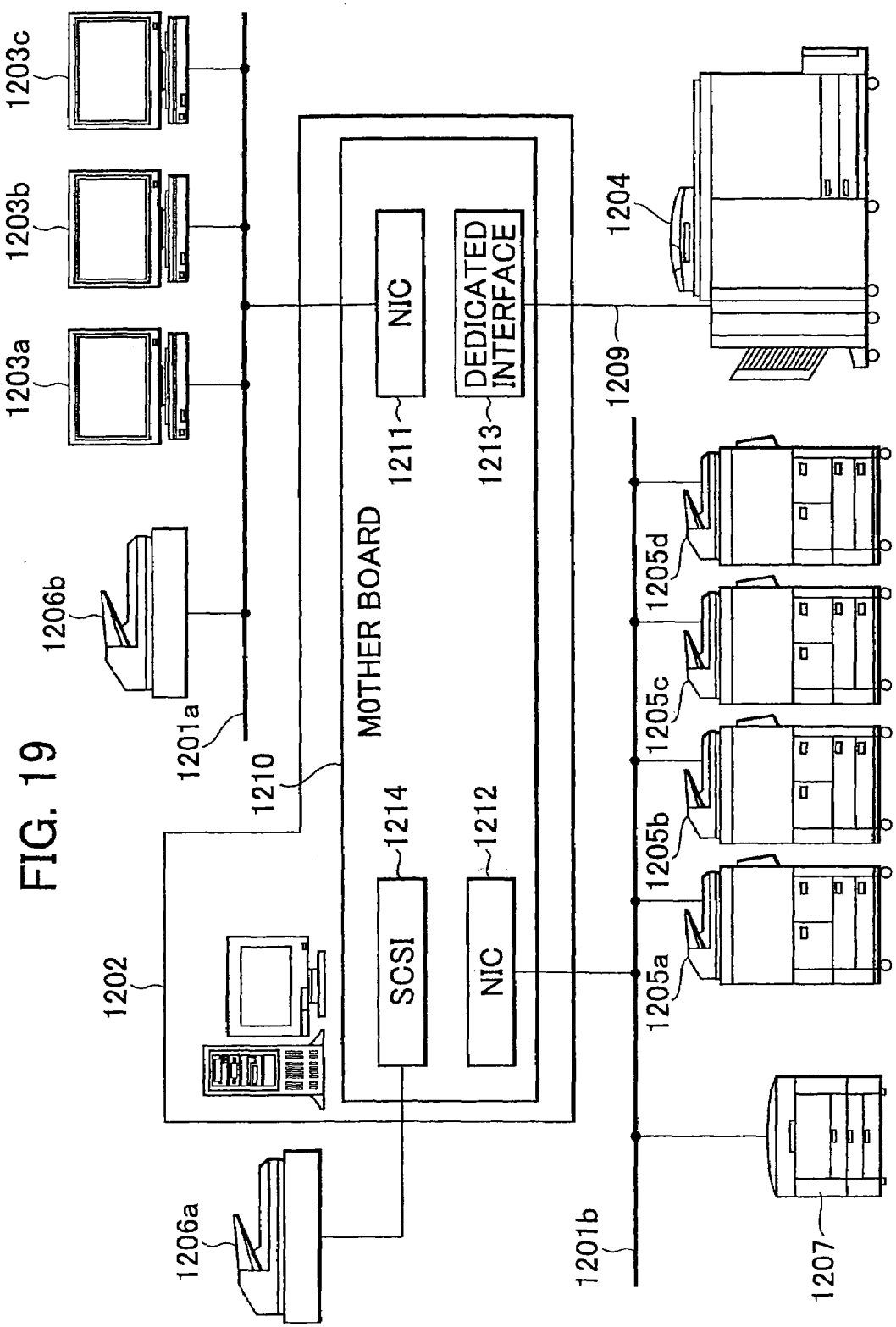
FIG. 19 is a diagram which illustrates a configuration of an image formation system according to an embodiment.
Figure 20:
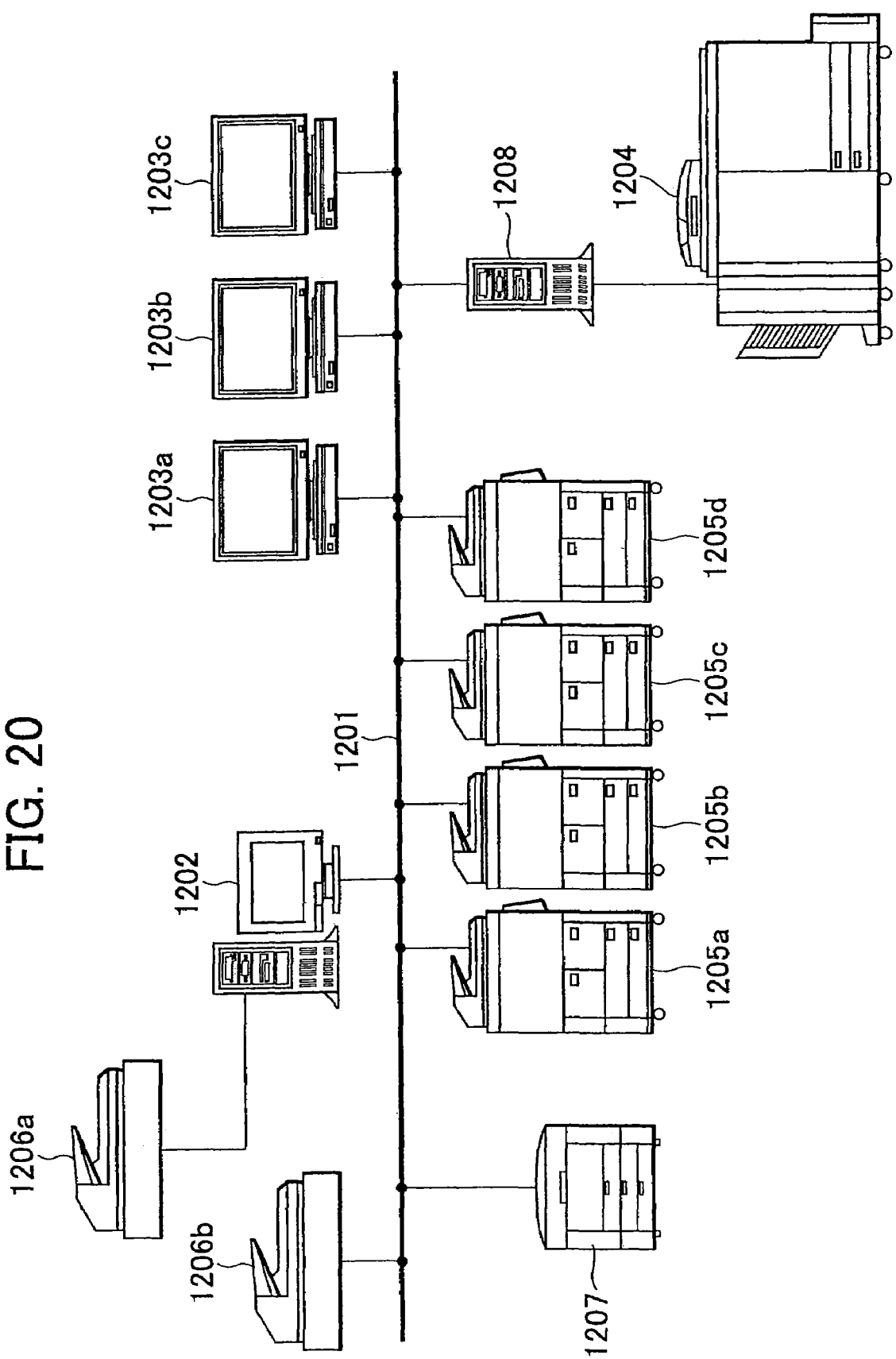
FIG. 20 is a diagram which illustrates a configuration of another image formation system.

FIG. 19 is a diagram which illustrates a configuration of an image formation system according to a sixth embodiment. FIG. 20 is a diagram which illustrates a configuration of an image formation system having a different network configuration from that in FIG. 19. These image formation systems have generally the same configuration including a document server 1202, computers 1203a, 1203b, and 1203c, MFPs 1204, 1205a, 1205b, 1205c, and 1205d, scanners 1206a and 1206b, a printer 1207, and the like, connected one to another through a network. The image formation system shown in FIG. 19 has a configuration wherein a network 1201 shown in FIG. 20 is divided into two network systems in order to improve performance. The two network systems will be referred to as "public network 1201a" and "private network 1201b", hereafter. The image formation system according to the present embodiment may have either of the network configurations, so description will be made mainly regarding the network configuration shown in FIG. 19.

The document server 1202 has two network interface cards (NICs) for the two system: one is an NIC 1211 connected to the public network 1201a; other is an NIC 1212 connected to the private network 1201b.

The computers 1203a, 1203b, and 1203c are client computers which transmit jobs to the document server 1202. Note that a number of client computers (not shown) are further connected other than the computers 1203a through 1203c. These client computers will be simply referred to as "client computer 1203" hereafter.

MPFs (multiple function peripherals) 1205 and a printer 1207 are connected to the private network 1201b. The MFPs 1205 perform scanning and printout in monochrome, or perform scanning and printout with low resolution in simple color mode of two colors. Note that devices such as scanners, printers, facsimiles (FAX), and the like, (not shown) are further connected to the private network 1201b besides the aforementioned MFPs.

The MPF 1204 is a full-color MPF which can perform scanning and printout with high resolution and high contrast in full color. The MFP 1204 has the same configuration as with the image formation apparatus described in the first embodiment, except that the MFP 1204 can be connected to a network, so description thereof will be omitted. The MFP 1204 may be connected to the private network 1201B so as to perform transmission/reception of data, but the amount of data becomes massive, and accordingly, the present embodiment has a configuration wherein multiple-bit data can be transmitted and received at the same time through an independent interface. Thus, the MFP 1204 is connected to the document server 1202 through an dedicated interface card 1213.

The scanners 1206 are devices for acquiring image data from the document sheet, and consist of two types of scanners: one type includes the scanner 1206a connected to the server 1202 through a SCSI interface; the other type includes the scanner 1206b connected to the public network 1201a. Note that the scanner 1206b may be connected to the private network 1201b.

The document server 1202 has a hardware configuration wherein the NICs (network interface cards) 1211 and 1212, the dedicated interface card 1213, a SCSI (small computer system interface) card 1214, and the like, are mounted on a mother board 1210 where the CPU, memory and the like have been mounted, through the PCI (peripheral component interconnect) bus.

On the other hand, application software for performing so-called DTP (desk top publishing) is executed on the client computers 1203, whereby various types of documents and pictures are formed and edited. The client computers 1203 convert the formed documents and pictures into the PDL data (page description language), and the generated PDL data is transmitted to the MFP 1204 or MFP 1205 through the network 1201a so as to perform printout.

The MFPs 1204 and 1205 each have communication means (NIC unit and interface unit, described later) for communicating with the document server 1202 through a communication cable 1209 connected to the network 1201b or the dedicated interface 1213. Accordingly, the information or the state of the MFPs 1204 and 1205 can be transmitted to the client computers 1203 in real time through the document server 1202.

The document server 1202 has utility software for executing according to the received information, whereby the MFPs 1204 and 1205 are managed by the server computer 1202. Note that an arrangement may be made wherein the client computer 1203 has utility software so as to manage the MFPs.

[Operating Display Unit]

Figure 21:
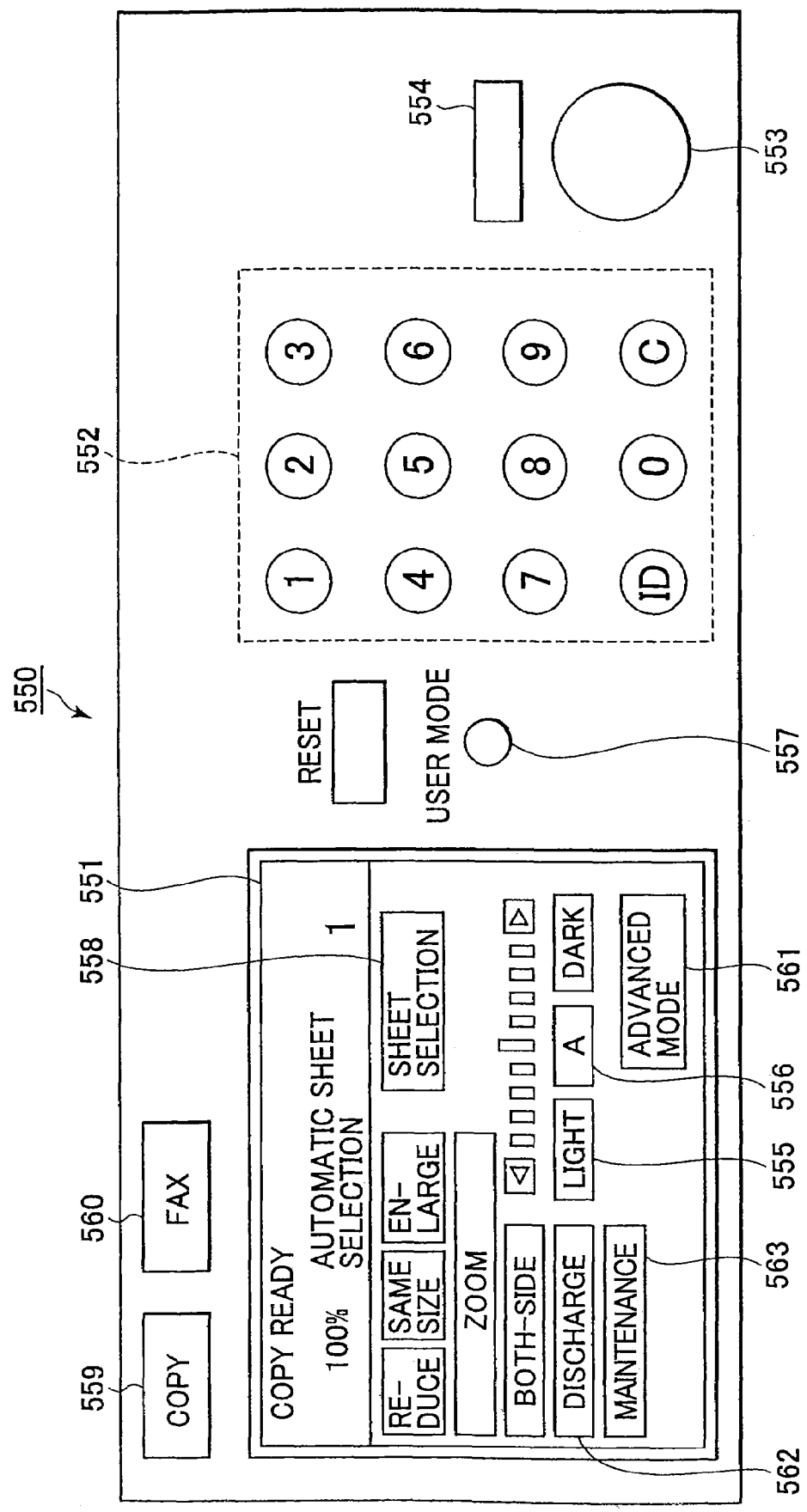
FIG. 21 is a diagram which illustrates an external view of the operation display unit 550.

FIG. 21 is a diagram which illustrates an external view of an operating display unit 550 of the MFPs 1204 and 1205. The operating display unit 550 shown in FIG. 21 has a similar configuration to that shown in FIG. 9, so description regarding the same components will be omitted.

Figure 22:
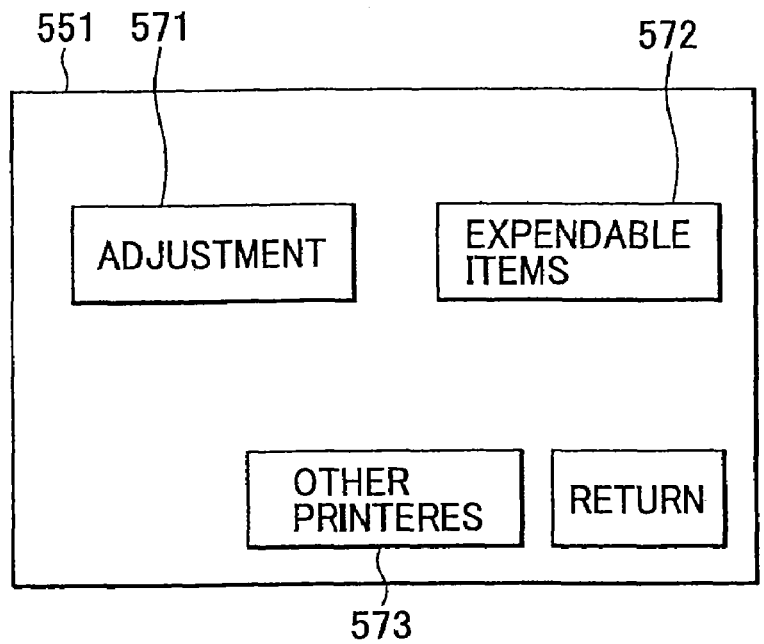
FIG. 22 is a diagram which illustrates a maintenance management screen displayed on the operation display unit 550.

Reference numeral 563 denotes a maintenance key 563. Upon the user pressing the maintenance key 563 in a standby state (ready), the screen shown in FIG. 22 is displayed. Note that the system has a configuration wherein the maintenance key 563 cannot be selected during printout.

[Maintenance Management]

FIG. 22 is a diagram which illustrates a maintenance management screen displayed on the operation display unit 550. Reference numeral 571 denotes a adjustment key for obtaining information with regard to the situation of each adjustment item. Reference numeral 572 denotes an expendables key for obtaining information with regard to the consumption situation of the expendables. Reference numeral 573 denotes an other-printers key for obtaining information with regard to the adjustment situation of other image formation apparatuses connected to the network.

Figure 23:
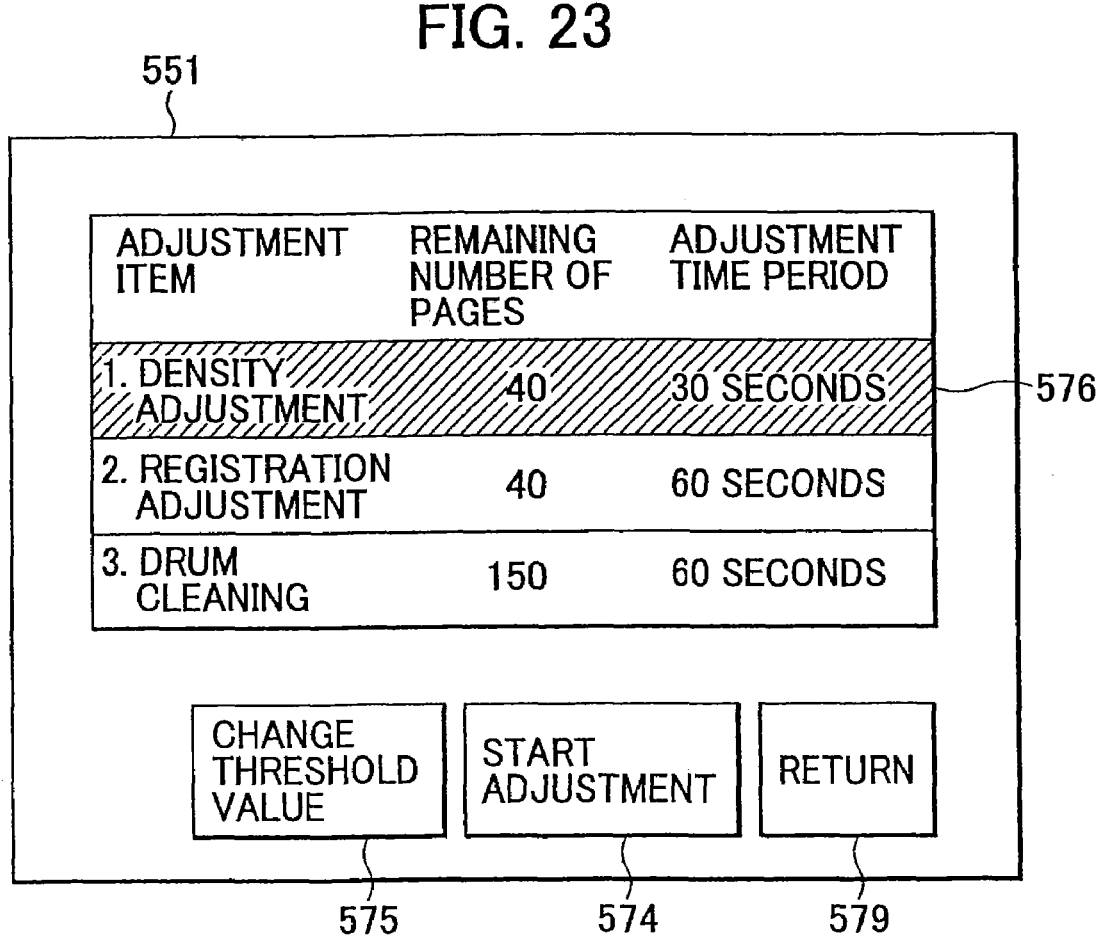
FIG. 23 is a diagram which illustrates an adjustment screen displayed on the operation display unit 550.

Upon the user selecting the adjustment key 571, the screen shown in FIG. 23 is displayed. FIG. 23 is a diagram which illustrates an adjustment screen displayed on the operation display unit 550. In this case, the list of "adjustment item", "remaining pages (remaining copies)", and "adjustment time period" is displayed on the adjustment screen. Here, the adjustment item is performed in order to prevent deviation of color tone from the original image due to various conditions such as the change in the environment where the image formation apparatus is situated, printout of a number of sheets, or the like. Examples of the adjustment items include the density adjustment, registration adjustment, and the like. The "remaining copies" means the number of remaining printing pages wherein the next adjustment item is to be executed.

Here, upon the user selecting the item on the touch panel in the standby state for performing adjustment, the selected adjustment item is hatched (in FIG. 23, a density adjustment item 576 is selected). Subsequently, upon the user pressing an adjustment start key 574, the selected adjustment mode (automatic adjustment or maintenance) is started.

As described above, the user can confirm the adjustment item wherein the adjustment mode could be started during the next job, in idle time between the preceding and next jobs, at the time of turning on the power supply, or the like. Furthermore, the user can select the mode on the same screen wherein in the event that there is time till the next job, the adjustment is performed beforehand. Furthermore, the user can select multiple adjustment items at the same time, and in this case, the selected multiple adjustment modes can be performed at the same time. For example, the user can select both of the density adjustment and the registration adjustment for performing both adjustment at the same time. Both the selected adjustment items are hatched, and upon the user pressing the adjustment start key 574, both the adjustment modes are executed.

The aforementioned adjustment item is performed following a predetermined number of copies being made after previous execution of the adjustment. With the present embodiment, the adjustment items are displayed in the order of execution of the adjustment. Note that it is needless to say that the adjustment items may be displayed in the order of the length of the adjustment time period.

In the event of performing the density adjustment processing, the image formation apparatus adjusts the density control bias having an influence upon the image density, such as a developing bias, exposure amount, or the like, whereby the image density of the toner image is adjusted to a suitable density. On the other hand, in the event of performing the registration adjustment processing, registration detection toner images (lines) are formed on the transfer belt 333 for each color as a test pattern, and each transferring position thereof is detected by the registration sensor 972 (see FIG. 7) so as to adjust the formation timing of the electrostatic latent image formed by the laser scanning and exposure based upon the detected result. The density adjustment processing and the registration adjustment processing will be described later in detail.

On the other hand, in the event of selecting the cleaning adjustment (drum cleaning), an adjustment mode is performed for preventing malfunctioning of the transfer belt. Note that each image formation apparatus has particular adjustment items, and accordingly, it is needless to say that the adjustment items according to the present invention are not restricted to those shown in the present embodiment.

In FIG. 23, reference numeral 575 denotes a threshold count change key for changing the number of copies which can be made from the previous adjustment up to the next adjustment (threshold count number). For example, in the event that the user selects the density adjustment item 576, the selected item is hatched, and upon the user pressing the threshold count change key 575, a threshold value change screen shown in FIG. 24 is displayed.

Figure 24:
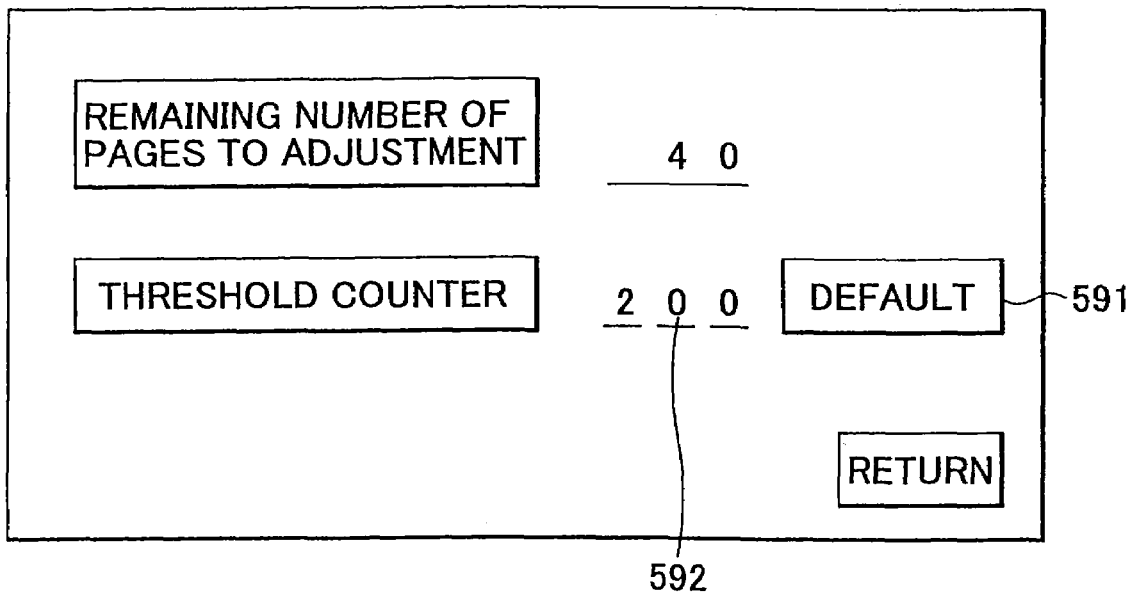
FIG. 24 is a diagram which illustrates a threshold change screen displayed on the operation display unit 550.

FIG. 24 is a diagram which illustrates the threshold change screen displayed on the operation display unit 550. The user can change a threshold value counter 592 on the screen. The threshold value counter 592 indicates the number of copies (X) which can be made from the previous adjustment up to the next adjustment, wherein the user can input a value with the numerical keypad 552. The remaining number of copies (Z) which can be made up to the next adjustment is changed synchronously with the change of the threshold value (X). With the number of copies which have been made from the previous adjustment as Y, the number of the remaining copies (Z) which can be made up to the next adjustment is represented by Expression (3).

$$Z = X - Y \qquad (3)$$

The changed threshold value is stored in the EEPROM 13. The threshold value is changed in the event of performing adjustment at intervals less than the default adjustment interval in order to give priority to the image quality, or in the event of performing adjustment at long intervals since the image formation apparatus is situated in the environment under suitable conditions (temperature, humidity, and the like) for image formation. On the other hand, upon the user pressing a default key 591, the threshold value 592 is returned to the default value (the value at the shipping time).

Figure 26:
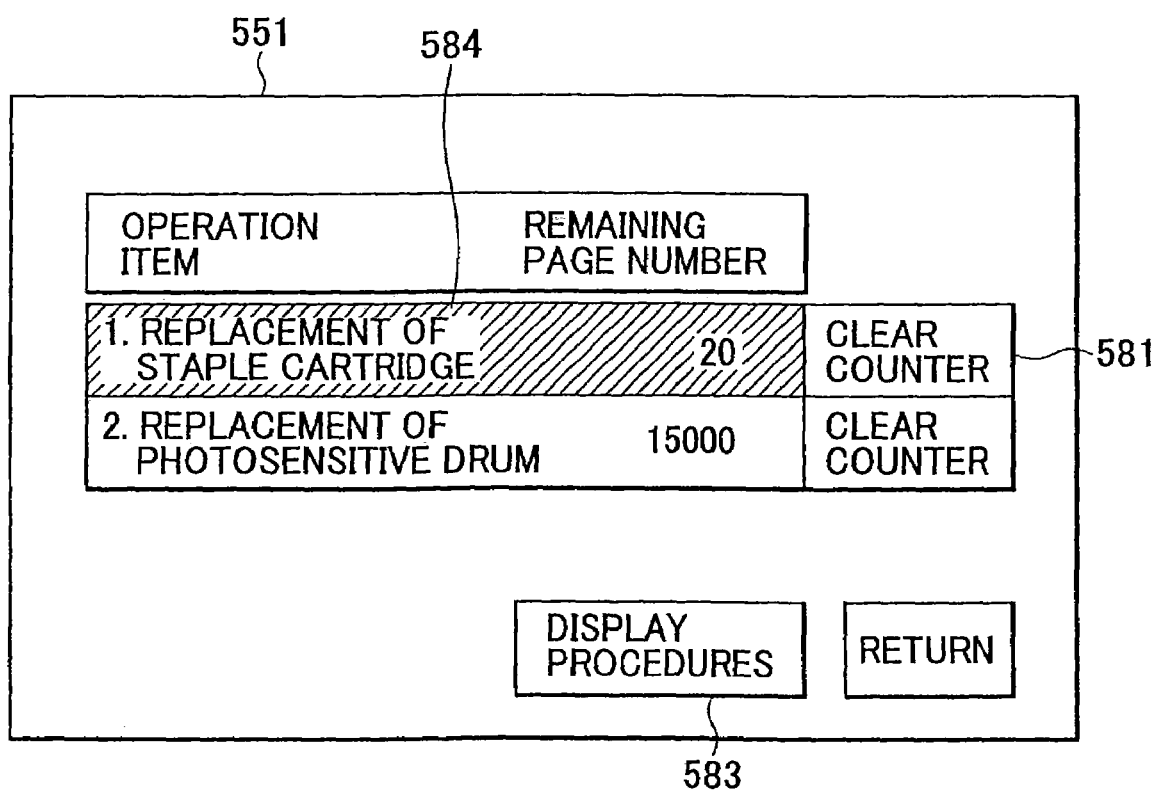
FIG. 26 is a diagram which illustrates a list screen for expendables displayed on the operation display unit 550.

In the event that the user selects the expendables key 572 on the maintenance management display shown in FIG. 22 in the standby state, the screen shown in FIG. 26 is displayed. FIG. 26 is a diagram which illustrates a list of expendables displayed on the operation display unit 550. Here, the user can display the procedure for replacement as follows. First, upon the user selecting the desired replacement item on the touch panel, the selected item is hatched. Next, upon the user selecting a procedure display key 583, the procedure for required replacement is displayed. For example, upon the user selecting the staple-cartridge replacement item in FIG. 26, the selected item is hatched. Subsequently, upon the user pressing the procedure display key 583, the procedure for replacement of staples is displayed.

In the event of performing replacement (supply) of the staple-cartridge prior to being completely out of staples, the user can clear the count value by selecting a counter clear key 581. With an example of the present embodiment, the staple cartridge stores 5,000 staples. Accordingly, upon the user pressing the counter clear key 581, the number of remaining staples is cleared to 5,000.

[Maintenance Management for Other Image Formation Apparatuses]

Figure 25:
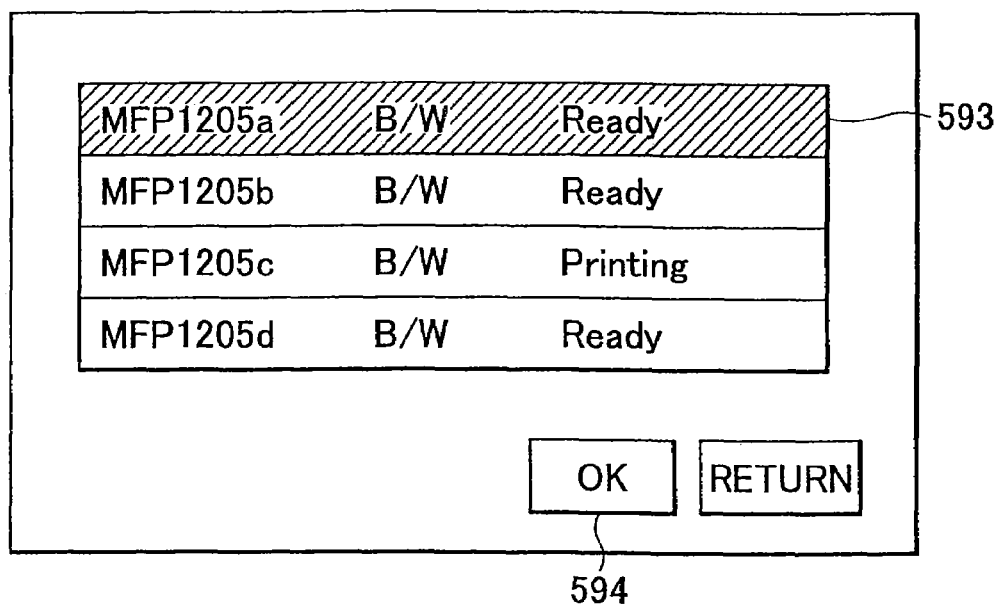
FIG. 25 is a diagram which illustrates a status screen displayed on the operation display unit 550.

In the event that the user presses an other-printers key 573 on the maintenance management screen shown in FIG. 22, the screen shown in FIG. 25 is displayed. FIG. 25 is a diagram which illustrates a status screen displayed on the operation display unit 550. The status screen displays the status of other image formation apparatuses connected through the network 101, specifically, MPFs 1205a through 1205d. With the example, the status of "Ready (standby for printing)" or "Printing (during printing)" is displayed for each image formation apparatus.

Other image formation apparatuses (MFPs) displayed on the screen have been registered in the image formation apparatus which is being operated by the user. Here, the user can confirm the adjustment situation (status) of a particular image formation apparatus as follows. First, upon the user selecting an item 593 for a desired image formation apparatus (in FIG. 25, the MFP 1205a is selected), the item 593 is hatched. Subsequently, upon the user pressing an OK key 594, a similar screen as shown in FIG. 23 described above is displayed. Note that it is needless to say that the adjustment items and the number of the remaining copies which can be made up to the next adjustment are different for each image formation apparatus. The screens for confirming the status of other image formation apparatuses connected through a network have the same configurations shown in FIGS. 24 and 26, so description thereof will be omitted. Thus, the user can confirm the adjustment situation (status) of other image formation apparatus connected through a network, and furthermore, can perform desired adjustment mode. The adjustment mode has been described in the first embodiment, so description thereof will be omitted.

[Adjustment Execution Processing]

Figure 27:
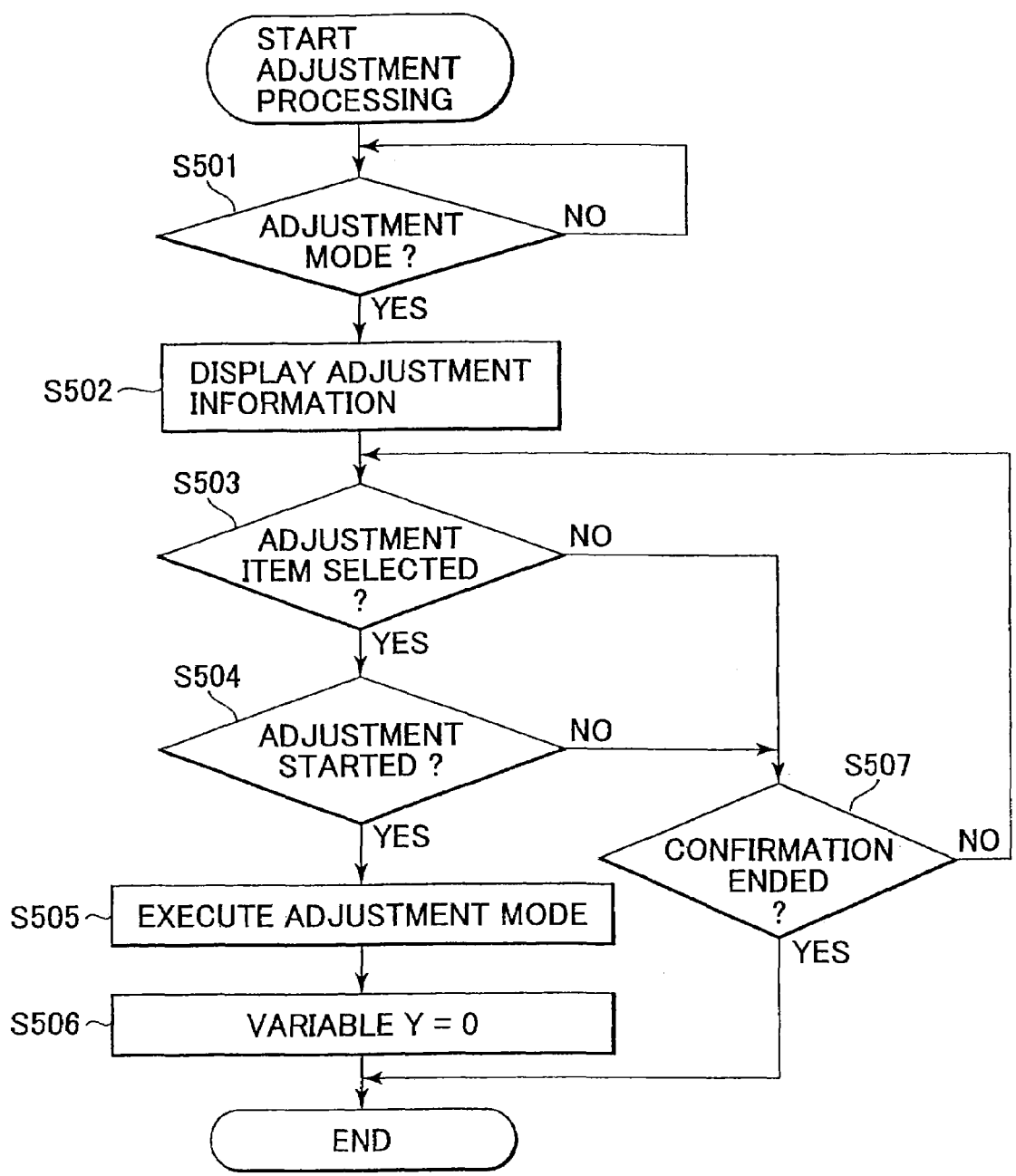
FIG. 27 is a flowchart which shows steps for adjustment execution processing performed at the time of the user selecting a maintenance key 563 on the operation display unit 550 of the image formation apparatus.

FIG. 27 is a flowchart which shows steps for adjustment execution processing performed at the time of the user selecting the maintenance key 563 on the operation display unit 550 of the image formation apparatus. The processing program is stored in the ROM 11 within the printer unit 300, and is executed by the CPU 15.

First, determination is made whether or not the system is in the adjustment mode (Step S501). Note that upon the user pressing the adjustment key 571 shown in FIG. 22, the system enters the adjustment mode. In the event that determination is made that the system is in the adjustment mode, adjustment information is displayed (Step S502). Examples of adjustment information displayed on the screen include adjustment items, the number of remaining copies which can be made up to the next adjustment, and a time period for adjustment, as shown in FIG. 23 described above.

Subsequently, determination is made whether or not the user selects any adjustment items (Step S503). In the event that the user has not select any adjustment item, determination is made whether or not end of confirmation is selected by the user pressing a return key 579 (Step S507). In the event that the return key 579 is not pressed by the user, and accordingly, end of confirmation is not selected, the flow returns to Step S503, and the same processing is repeated. Otherwise, the present processing ends.

On the other hand, in the event that the user has selected any adjustment item in Step S503, the system waits for the adjustment start key 574 to be selected (Step S504). That is to say, in the event that the adjustment start key 574 has not been selected, determination is made whether or not end of confirmation has been selected (Step S507). In the event that the return key 579 has not been pressed, i.e., in the event that end of confirmation has not been selected, the flow returns to Step S503, and the same processing is repeated.

On the other hand, in the event that the user presses the adjustment start key in Step S504, the adjustment mode processing corresponding to the selected adjustment item (Step S505) is performed. For example, in the event that the density adjustment has been selected, the above-described density adjustment processing is performed. In the event that multiple adjustment items have been selected, e.g., the density adjustment and the registration adjustment are selected, the above-described density adjustment processing and registration adjustment processing are consecutively performed. The parameters updated following adjustment are stored in the EEPROM 13.

Following the adjustment processing, the variable Y indicating the number of copies which have been made from the previous adjustment up to the present time is cleared to zero, the updated value is stored in the EEPROM 13 (Step S506), and the present processing ends. At this point in time, the number of remaining copies (Z) which can be made up to the next adjustment is equal to the threshold. On the other hand, in the event that the return key 579 is pressed by the user during standby in Step S504, determination is made that end of confirmation has been selected, and the present processing ends.

As described above, the user can easily confirm the adjustment item which could be performed during the next job in an idle time period up to the next job, at the time of turning on the power supply, or the like. Furthermore, in the event that there is time till the next job, the user can select the mode wherein the adjustment is performed beforehand. Furthermore, the user can select multiple adjustment items, whereby multiple adjustment items can be performed at the same time, thereby markedly reducing the downtime during the job due to adjustment.

[Network System]

Figure 28:
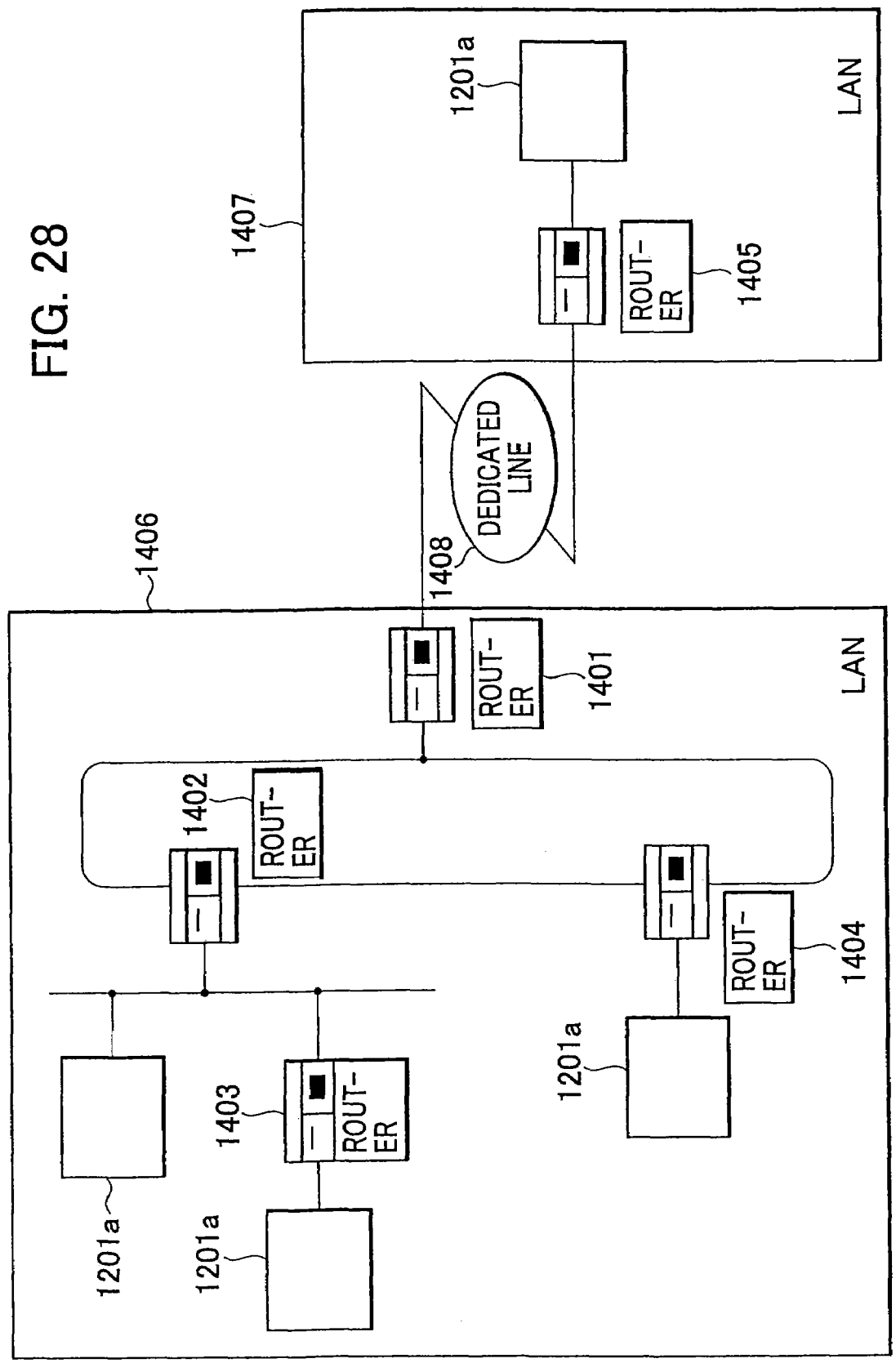
FIG. 28 is a diagram which illustrates a configuration of a network.

Next, description will be made regarding a configuration and operation for managing maintenance for other image formation apparatuses connected through a network. FIG. 28 is a diagram which illustrates a configuration of a network system. The networks 1201 (1201a, 1201b) are connected through a device for connecting networks one to another, which is referred to as "router", and forms a further network which is referred to as "LAN (local area network). A router 1401 within a LAN 1406 is connected to another router 1405 within another LAN 1407 through a dedicated line, and in the same way, a great number of networks forms a massive network.

Figure 29:
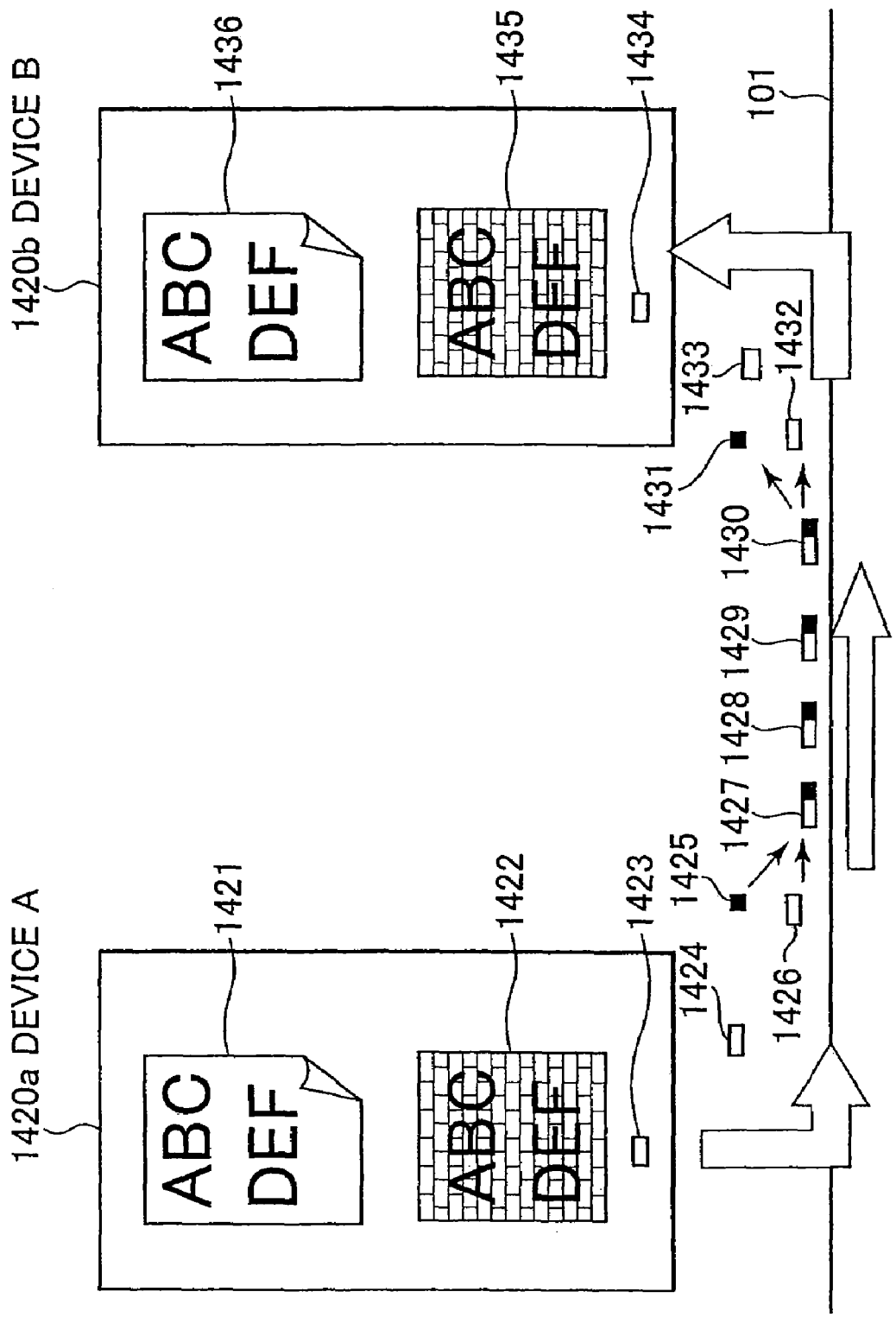
FIG. 29 is a diagram which shows the flow of data on the network.

FIG. 29 is a diagram for describing data transmitted on the network 1201. Let us say that a device A (1420a) which transmits data has data 1421. The data may be image data, PDL data, or a program. In the event of transmitting the data to a device B (1420B) through the network 1201, the data 1421 is subdivided into small data units as with data 1422 shown in FIG. 29.

The system adds header 1425 including the destination address and the like to each of subdivided data units 1423, 1424, 1426, and so on, so as to form packets, (e.g., packet 1427 in FIG. 29), and the generated packets are transmitted consecutively on the network 1201. Here, in the event of using the TCP/IP (Transmission Control Protocol/Internet Protocol), the IP address of the destination is used as a destination address. In the event that the header 1431 of the packet 1430 matches the address of the device B, the data 1432 is separated in the device B so as to be reproduced into the same data as the original data in the device A.

[Printer Driver]

Figure 30:
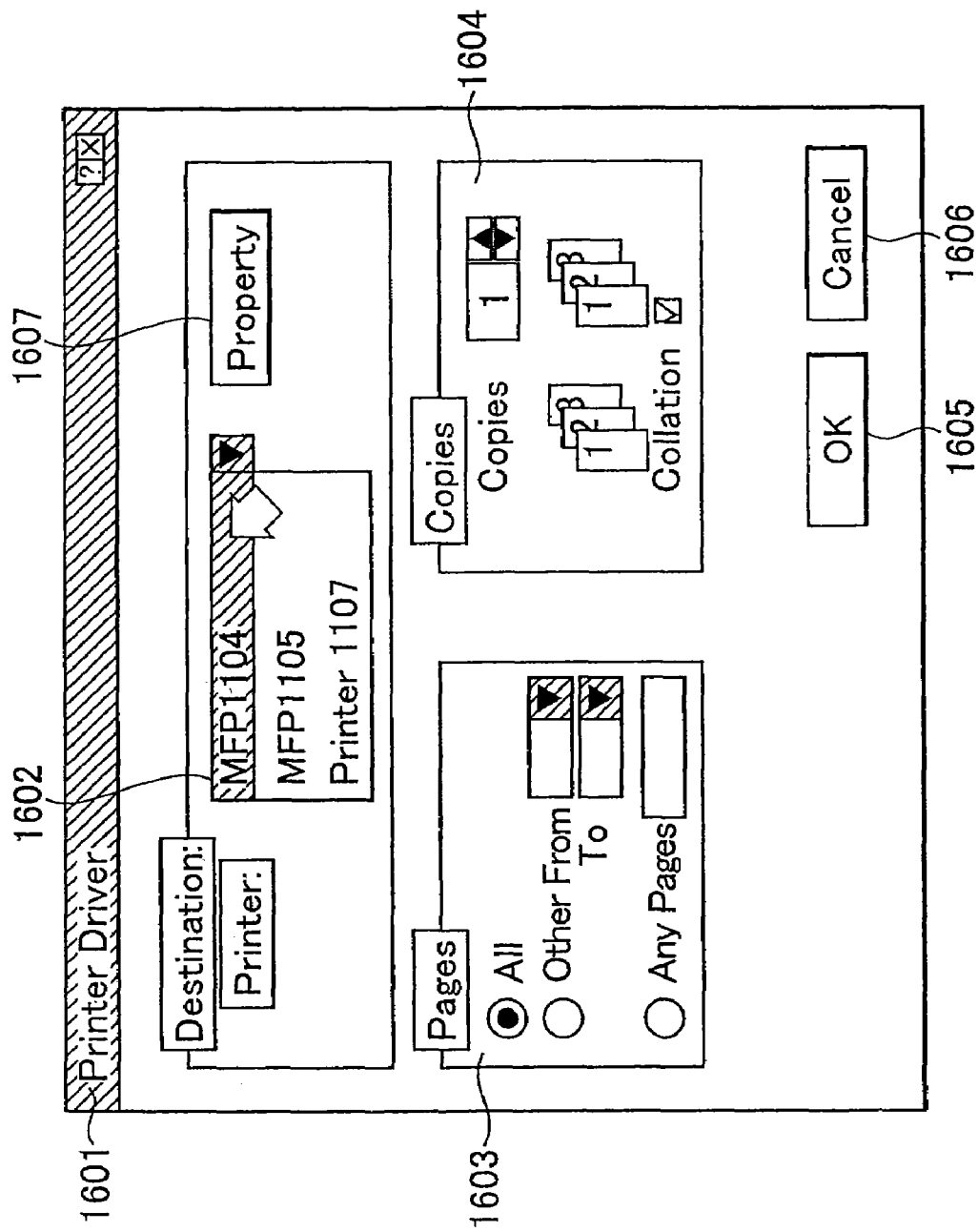
FIG. 30 is a diagram which illustrates a screen of a printer driver.

FIG. 30 is a diagram which illustrates a screen of a printer driver. With the example, image data is transmitted to a printer from the document server 1202 and the computer 1203 through the printer driver. The printer driver is a GUI for specifying printing operation, wherein the user can specify desired setting parameters and transmit desired image data to a destination such as a printer, by operating the GUI on the screen.

Reference numeral 1601 denotes a window of the printer driver. Reference numeral 1602 denotes a destination selecting column in the window for selecting the destination where the data is to be transmitted. With the example, the destination is selected from the MFPs 1204 and 1205, and the printer 1207. Reference numeral 1603 denotes a page setting column for determining which pages of the image formed by application software operating on the document server 1202 or the computer 1203 are output.

Reference numeral 1604 denotes a number-of-copies setting column for specifying the number of copies. Reference numeral 1607 denotes a property key for making detailed settings for the destination device selected with the destination selecting column 1602. In the event that user clicks the property key 1607, another screen is displayed, wherein the user can input device-specific setting information on the screen so as to perform special image processing. For example, the user can change the parameters of a gamma conversion unit or a spatial filter unit within the printer. This enables more detailed color reproduction or sharpness adjustment. Following desired settings being made, upon the user pressing an OK key 1605, printout is started. The user can cancel the printout by pressing a cancel key 1606.

[Operation with Web Browser]

FIG. 31 is a diagram which illustrates a main screen of a web service provided within the document server 1202. The system has a configuration wherein upon the user inputting the IP address of the server 1202 (with the example of the present embodiment, 192.168.100.11) in a URL address portion, the web service screen is read out from the server 1202 to be displayed.

The service tool is formed of tabs of a job status tab 1701, a device status tab 1702, a job submitting tab 1703, a scanning tab 1704, a configuration tab 1705, and a help tab 1706, and a maintenance status key 1712. The help tab 1706 includes a manual for the present service.

[Job Status]

The job status tab 1701 is formed of a device display portion 1707, a job status display portion 1709 for displaying active jobs, and a job history display portion 1711. In the event that all the jobs cannot be displayed on the job status display portion 1709 or the job history display portion 1711, upon the user pressing the job status key 1708 as necessary, all the active jobs are displayed. Furthermore, upon the user pressing a job history key 1710, all the job history is displayed.

Figure 32:
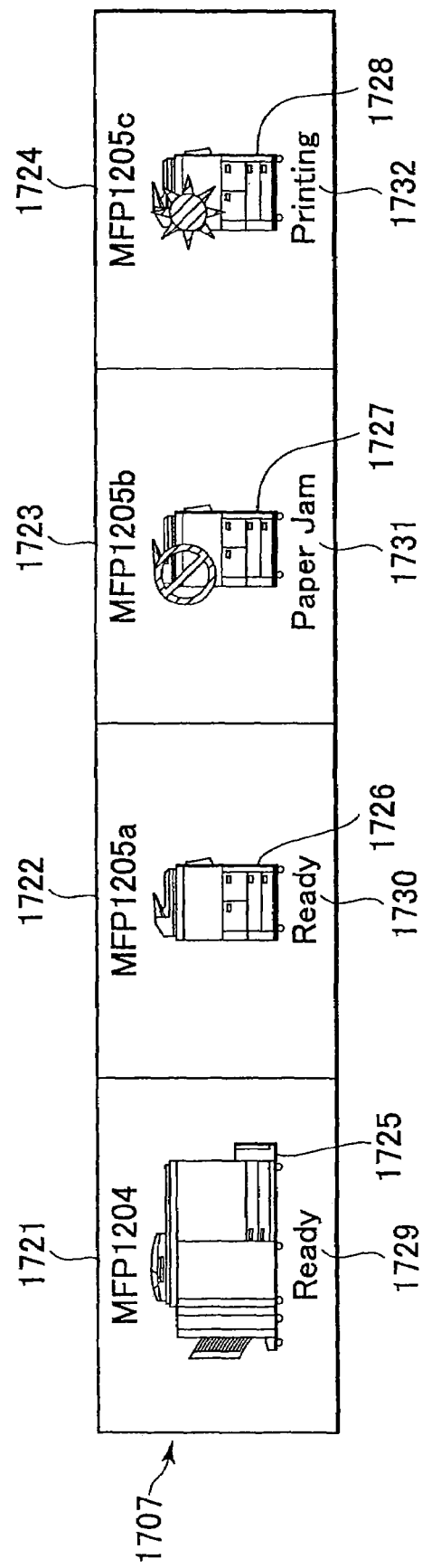
FIG. 32 is a diagram which illustrates a device display portion 1707.

FIG. 32 is a diagram which illustrates a device display portion 1707. With the example, device names 1721 through 1724, device icons 1725 through 1728, and the status information 1729 through 1732 for each device, are displayed. Here, the device icons are changed according to the status (see device icons 1728 and 1728). As described above, the user can confirm the status of each device from the change in the device icons 1725 through 1728, and from the character information of the status information 1729 through 1728.

FIG. 33 is a diagram which illustrates a job status display portion 1709. The user can monitor the status of each job within the server 1202 on the job status display portion 1709. For example, the job status such as "Spooling" (during reception of data prior to RIP), "Ripping" (during RIP), "Wait to Print" (waiting for printing), or "Printing" (during printing), is displayed. A job which is instructed to wait within the server at the time of the job being input is held with the status prior to RIP. In the event that error or jamming occurs, information thereof is displayed so as to alert the user. Following printout, the job is transmitted to the next finished job. Furthermore, other items such as job names 1741, target printers 1742, job priorities 1744, and the like, are displayed on the job status display portion 1709 for active jobs.

FIG. 34 is a diagram which illustrates the job history display portion 1711. The user can obtain information with regard to the history of jobs from the job history display portion 1711. In the event that the job has been completed normally, "Printed" is displayed. On the other hand, in the event that the job has been canceled during printout, "Canceled" is displayed. Furthermore, other items such as job names 1761, target printers 1762, job IDs 1764, and the like, are displayed on the job history display portion 1711. The user operates the server 1202 based upon the above-described information.

[Device Status]

A standardized database which is referred to as "MIB" (management information base) is built in the network interface within the MFPs 1204 and 1205, and the printer 1207. The MIB communicates with computers on a network following the network management protocol which is referred to as "SNMP" (Simple Network Management Protocol), thereby enabling interchange of necessary information with regard to the status of the device connected to the network, such as the MFP 1204, MFP 1205, or the like, with the computers 1202 and 1203.

For example, the user can detect information with regard to functions of the finisher 400 as equipment information for the MFPs 1204 and 1205, the presence or absence of error and jamming, and information whether the job is during printout or in idle. Furthermore, the user can obtain all the stationary information such as maintenance status for each MFP, equipment information for the MFPs 1204 and 1205, the status of the apparatus, settings of the network, job history, management and control of the status of use, and the like.

Figure 35:
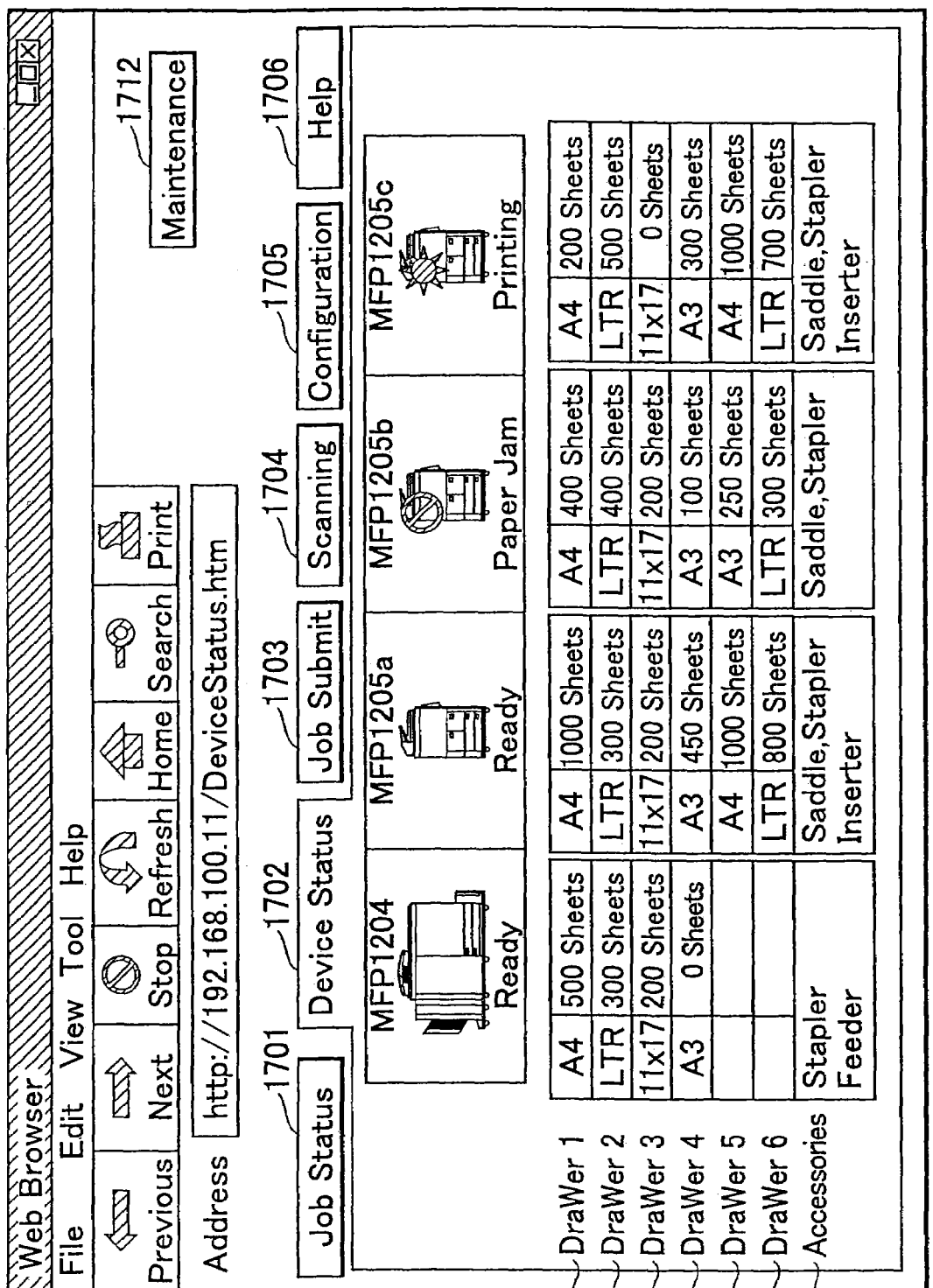
FIG. 35 is a diagram which illustrates a device status tab 1702.

FIG. 35 is a diagram which illustrates the device status tab 1702. On the tab, the size of sheets stored in a sheet cassette mounted within a device managed by the server 1202, and status of supply of sheets, are displayed. The user can confirm the sheet size, the status of supply 1801 through 1806, and status of accessories 1807 such as a finisher mounted to each device, beforehand.

Furthermore, the document server 1202 can give adjustment instructions required for the device as to the device connected through the network 1201 by the user selecting the maintenance key 1712. That is to say, upon the user pressing the maintenance key 1712, a screen similar to the screen shown in FIG. 25 described above is loaded. The detailed description thereof is generally the same as with the description regarding the operation display unit 550, so the detailed description will be omitted. In brief, the system has a configuration wherein the user can confirm the adjustment status for each MFP on the document server 1202, and can make desired adjustment instructions.

[Adjustment Execution Processing for Other MFPs]

Figure 36:
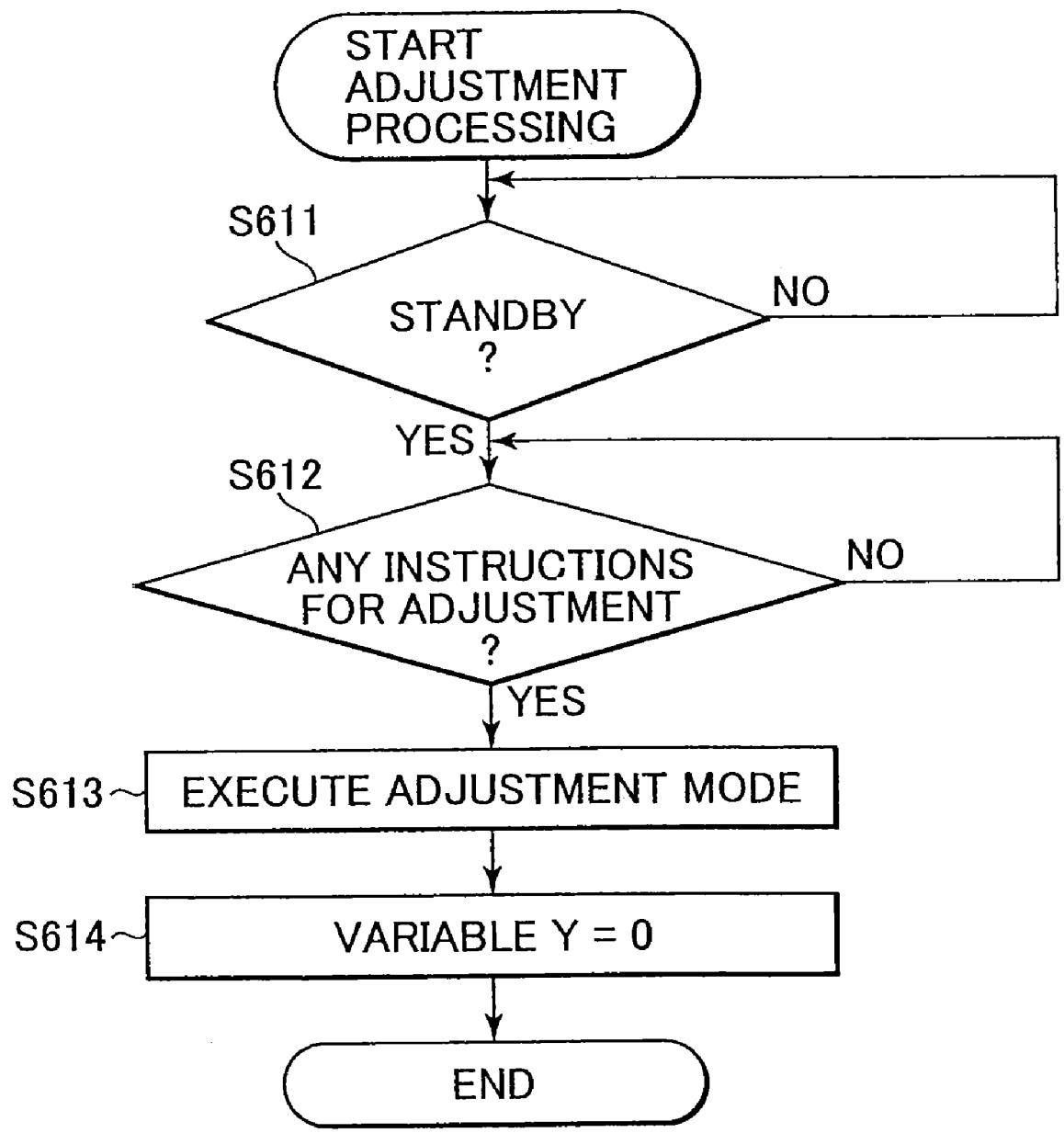
FIG. 36 is a flowchart which shows steps for adjustment execution processing at the time of performing adjustment mode following instructions from another image formation apparatus connected to the network.

FIG. 36 is a flowchart which shows steps for adjustment execution processing at the time of executing the adjustment mode following the instructions from other image formation apparatuses connected to the network. Here, an example is shown wherein the MFP 1205a performs adjustment mode following instructions from the different MFP 1204 or the server 1202 connected to the network 1201.

That is to say, an example is shown wherein adjustment instructions are given to the MFP 1205a from the operation display unit 550 of the MFP 1204 or the maintenance key 1712 on the web service of the document server 1202. The processing is stored in the ROM 11 within the printer unit 300, and is executed by the CPU 15 as with the processing shown in FIG. 27.

First, the system waits for the MFP 1205a to be in the standby state (Step S611). In the event that the MFP 1205a is standing by, determination is made whether or not the MFP 1205a has received adjustment instructions from an external unit connected to the network 1201, e.g., the MFP 1204 or server 1202 (Step S612). In the event that determination is made that the MFP 1205a has received adjustment instructions, the MFP 1205a analyzes the adjustment instructions, and performs specified adjustment mode (Step S613). The adjustment mode in this example is the same as in FIG. 27 described above, so description thereof will be omitted.

Following the adjustment processing, the variable Y indicating the number of copies which have been made from the previous adjustment up to the present time is cleared to zero, and the updated value is stored in the EEPROM 13 (Step S614). At this point in time, the number of remaining copies Z which can be made up to the next adjustment is equal to the threshold.

As described above, with the present embodiment, multiple MFPs are connected through a network, and accordingly, the user can easily confirm the adjustment item of any MFP, which could be performed during the next job, and can give required adjustment instructions to the MFP. The user can give adjustment instructions from one MFP to another MFP connected to the network, and thus, even in the event that MFPs are distant one from another, the user can perform adjustment for the distant MFP without the user moving to the distant MFP.

While description has been made above regarding the embodiments of the present invention, the present invention is not restricted to these embodiments, but rather, the present invention may be applied to any configuration as long as the configuration satisfies any of the appended claims or any of the embodiments.

For example, while the density adjustment and registration adjustment have been shown as examples of the items of the maintenance in the above-described embodiments, actual maintenance includes more various items. Furthermore, the maintenance according to the present invention should be understood in the broad sense, and encompasses not only adjustment of the component, which means maintenance in the general sense, but also cleaning, replacement and supply of expendables, and the like.

FIGS. 37 through 39 are diagrams showing item list of the maintenance. The maintenance items described in the item list and the related information are registered in the ROM 11 within the MFP, for example, and can be read out by the CPU 15. Specifically, the item of the maintenance, the type thereof, the standard of judgment, and the estimated required time period (estimated time period), are listed in the item list. As examples of types of maintenance, replacement of expendables and regular cleaning are shown. Furthermore, the output value from the sensor or the count value from the counter (time, copies) is used for making determination whether or not maintenance should be made. Examples of the output value from the sensor include detected value of the status of toner, sheets, or the like. Examples of the count value include the number wherein the number of copies which have been made is subtracted from the number of the threshold, and the remaining time wherein the elapsed time is subtracted from the setting time. Note that the items of the estimated time period which is difficult to be estimated are left blank.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image formation apparatus for forming images based on input image data, said apparatus comprising:
    an automatic adjustment portion adapted to perform automatic adjustment of said image formation apparatus for each of a plurality of adjustment items;
    a counting portion adapted to count the number of image formation pages from a last automatic adjustment, for each automatic adjustment item which said automatic adjustment portion performs;
    a control portion adapted to effect automatic adjustment by an automatic adjustment portion, in response to the number of image formation pages counted by said counting portion, reaching a first threshold value;
    a setting portion adapted to set, for each of the plurality of adjustment items, a second threshold value less than the first threshold value; and
    a determining portion adapted to determine, for each of the plurality of adjustment items, whether the number of image formation pages counted by said counting portion have reached the second threshold value set by said setting portion, before starting execution of the next image formation job,
    wherein, in the event that said determining portion determines that there is at least an adjustment item for which the number of image formation pages counted by said counting portion have reached the second threshold value, said control portion effects automatic adjustment by said automatic adjustment portion before starting execution of the next image formation job, even though the number of image formation pages counted by said counting portion has not reached the first threshold value, and
    wherein the second threshold value is automatically determined based on an average number of image formation sheets per job, within a predetermined period or within a predetermined number of times of image formation jobs.

2. An image formation apparatus according to claim 1, wherein the plurality of adjustment items includes at least density adjustment, which forms an image for density detection and determines density of the image for density detection, and registration adjustment, which forms an image for position detection and determines a position of the image for position detection, and at least one other adjustment item.

3. An image formation apparatus according to claim 2, wherein the at least one other adjustment item is cleaning adjustment.

* * * * *